US012111735B2

(12) United States Patent
Creed

(10) Patent No.: US 12,111,735 B2
(45) Date of Patent: Oct. 8, 2024

(54) DATA ERROR IDENTIFICATION PRIOR TO ROLE REVERSAL ON A REMOTE DATA REPLICATION FACILITY

(71) Applicant: Dell Products, L.P., Hopkinton, MA (US)

(72) Inventor: John Creed, Innishannon (IE)

(73) Assignee: Dell Products, L.P., Hopkinton, MA (US)

( * ) Notice: Subject to any disclaimer, the term of this patent is extended or adjusted under 35 U.S.C. 154(b) by 144 days.

(21) Appl. No.: 18/064,318

(22) Filed: Dec. 12, 2022

(65) Prior Publication Data

US 2024/0193044 A1    Jun. 13, 2024

(51) Int. Cl.
*G06F 11/14* (2006.01)

(52) U.S. Cl.
CPC ...... *G06F 11/1451* (2013.01); *G06F 11/1435* (2013.01); *G06F 11/1464* (2013.01)

(58) Field of Classification Search
CPC ............ G06F 11/1435; G06F 11/1451; G06F 11/1458; G06F 11/1461; G06F 11/1464; G06F 11/1466; G06F 11/1469; G06F 11/2053; G06F 11/2056; G06F 11/2094; G06F 3/0646; G06F 3/0647; G06F 3/0649; G06F 3/065; G06F 3/0629; H04L 67/1001; H04L 67/1095; H04L 67/1097; H04L 67/60
See application file for complete search history.

(56) References Cited

U.S. PATENT DOCUMENTS

| | | | | |
|---|---|---|---|---|
| 2001/0049800 A1* | 12/2001 | Suzuki | ................. | G06F 3/0601 |
| | | | | 714/6.2 |
| 2005/0138526 A1* | 6/2005 | Stouffer | ................. | G11B 27/11 |
| 2006/0129876 A1* | 6/2006 | Uemura | ............. | G06F 11/1076 |
| | | | | 714/E11.034 |
| 2006/0253731 A1* | 11/2006 | Petruzzo | ............. | G06F 11/1466 |
| | | | | 714/6.2 |
| 2015/0317194 A1* | 11/2015 | Sampath | ............... | H04L 41/145 |
| | | | | 714/703 |
| 2019/0278492 A1* | 9/2019 | Borlick | ................... | G06F 3/067 |
| 2020/0358621 A1* | 11/2020 | Ngo | ....................... | H04L 67/561 |
| 2023/0008978 A1* | 1/2023 | Puvvada | ............ | G06F 11/2097 |

FOREIGN PATENT DOCUMENTS

| WO | WO-2021126257 A1 * | 6/2021 | ......... G06F 11/1469 |
|---|---|---|---|
| WO | WO-2022135690 A1 * | 6/2022 | |

* cited by examiner

*Primary Examiner* — Joseph O Schell
(74) *Attorney, Agent, or Firm* — Anderson Gorecki LLP

(57) ABSTRACT

A data verification process is implemented before performing role reversal on a remote data replication facility to identify data mismatch errors prior to failover or failback on the remote data replication facility. In situations where the role reversal is planned sufficiently far in advance, a full data scan is implemented by comparing the Data Integrity Field (DIF) information of each track of data on the primary storage array with the DIF information of each corresponding track of data on the backup storage array. In situations where the role reversal is more imminent, a quick scan is implemented by comparing metadata signatures for each track of data on the primary storage array with the metadata signatures of each corresponding track of data on the backup storage array. Once any data mismatch errors are identified, the data on the backup storage array can be corrected prior to role reversal.

20 Claims, 12 Drawing Sheets

Prior to failover

Failover

Failback

DATA ERROR IDENTIFICATION PRIOR TO ROLE REVERSAL ON A REMOTE DATA REPLICATION FACILITY

FIELD

This disclosure relates to computing systems and related devices and methods, and, more particularly, to data error identification prior to role reversal on a remote data replication facility.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A data verification process is implemented before performing role reversal on a remote data replication facility to identify data mismatch errors prior to failover or failback on the remote data replication facility. In situations where the role reversal is planned sufficiently far in advance, a full data scan is implemented by comparing the Data Integrity Field (DIF) information of each track of data on the primary storage array with the DIF information of each corresponding track of data on the backup storage array. In situations where the role reversal is more imminent, a quick scan is implemented by comparing metadata signatures for each track of data on the primary storage array with the metadata signatures of each corresponding track of data on the backup storage array. Once any data mismatch errors are identified, the data on the backup storage array can be corrected prior to role reversal.

In some embodiments, a method of data error identification prior to role reversal on a remote data replication facility includes implementing a remote data replication facility including a primary storage array and a backup storage array. The method includes replicating filesystems included in a remote data replication group on the remote data replication facility from the primary storage array to the backup storage array, each filesystem being stored on a first plurality of tracks of backend storage resources of the primary storage array and being stored on a respective second plurality of tracks of backend storage resources of the backup storage array. The method includes servicing host IO operations on the filesystems by the primary storage array from data stored in the first plurality of tracks of the backend storage resources of the primary storage array. The method also includes identifying an upcoming role reversal event on the remote data replication facility, the role reversal event being associated with a change on the remote data replication facility after which the backup storage array will be responsible for servicing subsequent host IO operations on the filesystems using data stored in the respective second plurality of tracks of the backend storage resources of the backup storage array. The method includes, in response to identifying the upcoming role reversal event, implementing a comparison of the first plurality of tracks of the backend storage resources of the primary storage array with corresponding second plurality of tracks of the backend storage resources of the backup storage array, the comparison being implemented before implementing the role reversal event. The method also includes, after completion of the comparison of the first plurality of tracks of the backend storage resources of the primary storage array with corresponding second plurality of tracks of the backend storage resources of the backup storage array, implementing the role reversal event.

In some embodiments, the step of implementing the comparison of the first plurality of tracks of the backend storage resources of the primary storage array with corresponding second plurality of tracks of the backend storage resources of the backup storage array includes implementing a quick scan by comparing metadata track signatures for the tracks on primary storage array with metadata track signatures for the tracks on the backup storage array.

In some embodiments, the quick scan is implemented, for each track, by obtaining a first track signature for the track from metadata on the primary storage array, obtaining a second track signature for the track from metadata on the backup storage array, and comparing the first track signature with the second track signature. In response to a determination that the first track signature is not the same as the second track signature, adding a track identifier for the track to a list of identified data errors indicating that that the track on the backup storage array contains data that may not be the same as the data contained in the track on the primary storage array, and in response to a determination that the first track signature is the same as the second track signature, not adding the track identifier for the track to the list of identified data errors.

In some embodiments, each track has a plurality of sectors, and each track signature includes a respective field for each of the plurality of sectors, each respective field being incremented each time data contained in the respective sector is updated. In some embodiments, each track has sixteen sectors, and each field is a two-bit value.

In some embodiments, implementing the comparison of the first plurality of tracks of the backend storage resources of the primary storage array with corresponding second plurality of tracks of the backend storage resources of the backup storage array comprises implementing a full scan based on Data Integrity Field (DIF) values stored with the tracks on the respective backend storage resources.

In some embodiments, the full scan includes, for each track, obtaining a first DIF value for the track by reading the first DIF value from the track in the backend storage resources of the primary storage array, obtaining a respective second DIF value for the track by reading the second DIF value from the track in the backend storage resources of the backup storage array, and comparing the first DIF value with the respective second DIF value. In response to a determination that the first DIF value is not the same as the second DIF value, adding a track identifier for the track to a list of identified data errors indicating that that the track on the backup storage array contains data that is not the same as the data contained in the track on the primary storage array, and in response to a determination that the first DIF value is the same as the second DIF value, not adding the track identifier for the track to the list of identified data errors.

In some embodiments, the method further includes determining an amount of time until occurrence of the upcoming role reversal event, determining a first amount of time required to implement a quick scan by comparing metadata track signatures for the tracks on primary storage array with metadata track signatures for the tracks on the backup storage array, determining a second amount of time required to implement a full scan based on Data Integrity Field (DIF) values stored with the tracks on the respective backend storage resources wherein the comparison is implemented on the primary storage array, and implementing the full scan if the second amount of time required to implement a full scan is less than the amount of time until occurrence of the upcoming role reversal event, and implementing the quick scan if the second amount of time required to implement a full scan is more than the amount of time until occurrence of the upcoming role reversal event.

In some embodiments, the comparison is implemented on the primary storage array. In some embodiments, the method further includes determining from the comparison at least one data error on the backup storage array, and correcting the at least one data error on the backup storage array prior to implementing the role reversal event.

In some embodiments, the remote data replication facility includes a plurality of backup storage arrays. In some embodiments, the method further includes implementing the comparison of the first plurality of tracks of the backend storage resources of the primary storage array with corresponding second plurality of tracks of the backend storage resources of each of the backup storage arrays to determine any data errors on any of the backup storage arrays, identifying one of the backup storage arrays with a fewest number of data errors, and selecting the backup storage array with the fewest number of data errors to participate in the role reversal event.

In some embodiments, a system for data error identification prior to role reversal on a remote data replication facility includes one or more computers and one or more storage devices storing instructions that are operable, when executed by the one or more computers, to cause the one or more computers to perform operations including implementing a remote data replication facility including a primary storage array and a backup storage array. The instructions that are further operable to perform operations including replicating filesystems included in a remote data replication group on the remote data replication facility from the primary storage array to the backup storage array, each filesystem being stored on a first plurality of tracks of backend storage resources of the primary storage array and being stored on a respective second plurality of tracks of backend storage resources of the backup storage array. The instructions are further operable to perform operations including servicing host IO operations on the filesystems by the primary storage array from data stored in the first plurality of tracks of the backend storage resources of the primary storage array. The instructions are further operable to perform operations including identifying an upcoming role reversal event on the remote data replication facility, the role reversal event being associated with a change on the remote data replication facility after which the backup storage array will be responsible for servicing subsequent host IO operations on the filesystems using data stored in the respective second plurality of tracks of the backend storage resources of the backup storage array. The instructions are further operable to perform operations including, in response to identifying the upcoming role reversal event, implementing a comparison of the first plurality of tracks of the backend storage resources of the primary storage array with corresponding second plurality of tracks of the backend storage resources of the backup storage array, the comparison being implemented before implementing the role reversal event. The instructions are further operable to perform operations including, after completion of the comparison of the first plurality of tracks of the backend storage resources of the primary storage array with corresponding second plurality of tracks of the backend storage resources of the backup storage array, implementing the role reversal event.

In some embodiments, implementing the comparison of the first plurality of tracks of the backend storage resources of the primary storage array with corresponding second plurality of tracks of the backend storage resources of the backup storage array includes implementing a quick scan by comparing metadata track signatures for the tracks on primary storage array with metadata track signatures for the tracks on the backup storage array.

In some embodiments, the quick scan is implemented, for each track, by obtaining a first track signature for the track from metadata on the primary storage array, obtaining a second track signature for the track from metadata on the backup storage array, and comparing the first track signature with the second track signature. In response to a determination that the first track signature is not the same as the second track signature, adding a track identifier for the track to a list of identified data errors indicating that that the track on the backup storage array contains data that may not be the same as the data contained in the track on the primary storage array, and in response to a determination that the first track signature is the same as the second track signature, not adding the track identifier for the track to the list of identified data errors.

In some embodiments, each track has a plurality of sectors, and each track signature includes a respective field for each of the plurality of sectors, each respective field being incremented each time data contained in the respective sector is updated. In some embodiments, each track has sixteen sectors, and each field is a two-bit value.

In some embodiments, implementing the comparison of the first plurality of tracks of the backend storage resources of the primary storage array with corresponding second plurality of tracks of the backend storage resources of the backup storage array comprises implementing a full scan based on Data Integrity Field (DIF) values stored with the tracks on the respective backend storage resources.

In some embodiments, the full scan includes, for each track, obtaining a first DIF value for the track by reading the first DIF value from the track in the backend storage resources of the primary storage array, obtaining a respective second DIF value for the track by reading the second DIF value from the track in the backend storage resources of the backup storage array, and comparing the first DIF value with the respective second DIF value. In response to a determination that the first DIF value is not the same as the second DIF value, adding a track identifier for the track to a list of identified data errors indicating that that the track on the backup storage array contains data that is not the same as the data contained in the track on the primary storage array, and in response to a determination that the first DIF value is the same as the second DIF value, not adding the track identifier for the track to the list of identified data errors.

In some embodiments, the instructions are further operable to perform operations including determining an amount of time until occurrence of the upcoming role reversal event, determining a first amount of time required to implement a quick scan by comparing metadata track signatures for the tracks on primary storage array with metadata track signatures for the tracks on the backup storage array, determining a second amount of time required to implement a full scan based on Data Integrity Field (DIF) values stored with the tracks on the respective backend storage resources wherein the comparison is implemented on the primary storage array, and implementing the full scan if the second amount of time required to implement a full scan is less than the amount of time until occurrence of the upcoming role reversal event, and implementing the quick scan if the second amount of time required to implement a full scan is more than the amount of time until occurrence of the upcoming role reversal event.

In some embodiments, the comparison is implemented on the primary storage array. In some embodiments, the method further includes determining from the comparison at least one data error on the backup storage array, and correcting the at least one data error on the backup storage array prior to implementing the role reversal event.

In some embodiments, the remote data replication facility includes a plurality of backup storage arrays. In some embodiments, the method further includes implementing the comparison of the first plurality of tracks of the backend storage resources of the primary storage array with corresponding second plurality of tracks of the backend storage resources of each of the backup storage arrays to determine any data errors on any of the backup storage arrays, identifying one of the backup storage arrays with a fewest number of data errors, and selecting the backup storage array with the fewest number of data errors to participate in the role reversal event.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
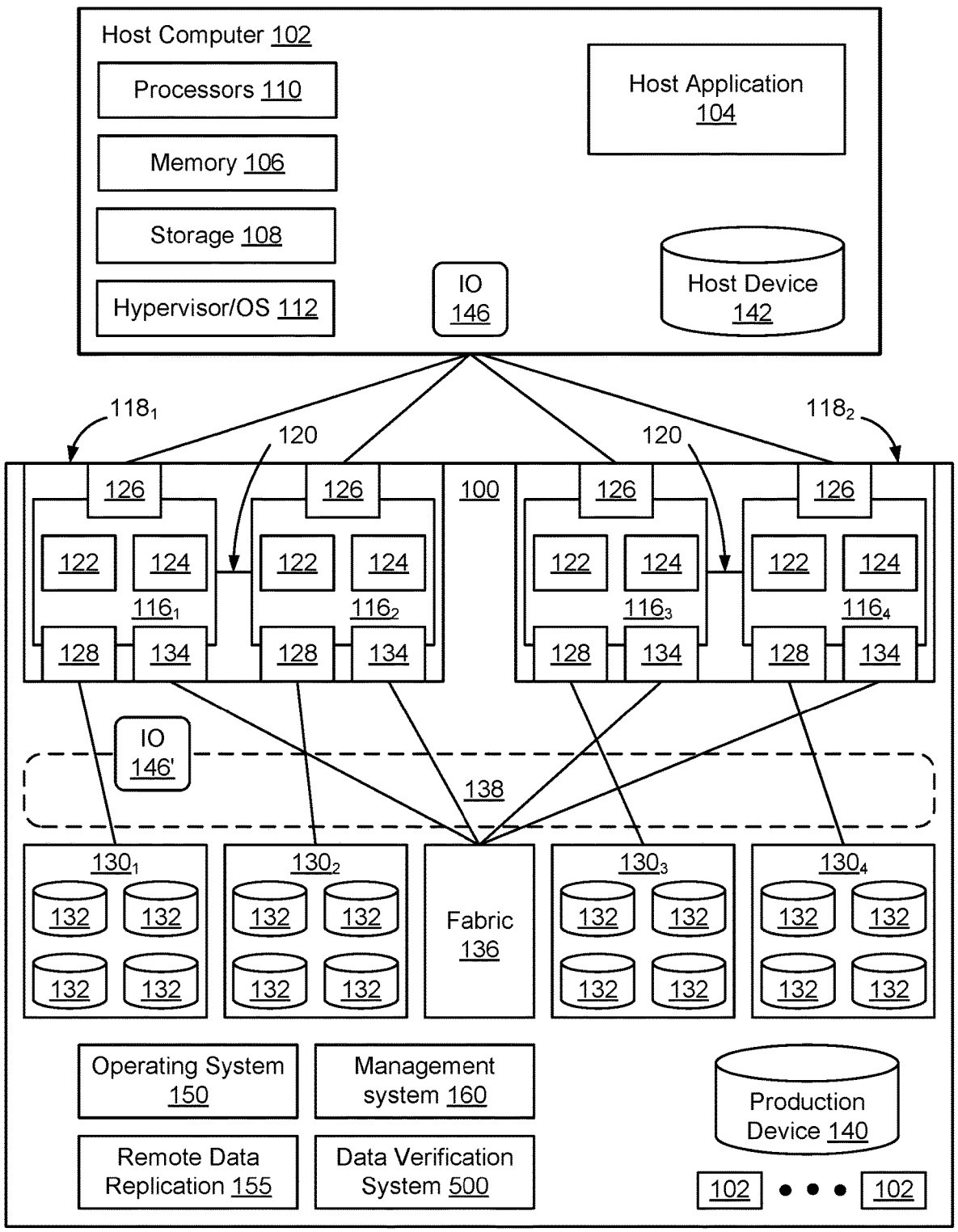
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

Storage system 100 or storage array 130, in some embodiments, implements a Remote Data Replication (RDR) process 155 configured to cause subsets of data stored within storage resources 132 of storage array 130 to be mirrored in real time (as IOs occur) by the storage array 130 to one or more similar backup storage arrays 130. One example Remote Data Replication technology is used by EMC/ Dell™ and referred to as Symmetrix Remote Data Facility, also referred to as SRDF or RDF. However, implementations are not limited to an implementation that uses SRDF as the remote data replication technology, as other synchronous or asynchronous remote data replication technologies and remote replication techniques may be used as well.

It is possible for a primary storage array 130 (R1) to perform data replication to a backup storage array 130 (R2) where the storage systems 100 are compatible and properly configured. The RDR application 155, when executed on storage system 100, enables the storage array 130 to participate in storage system level data replication between sets of mirroring pairs of storage systems 100. A set of storage arrays 130 that are configured for data to be mirrored from a primary storage array 130 (R1) to a backup storage array 130 (R2) will be referred to herein as a "Remote Data Replication (RDR) facility". A given storage system, such as storage system 100, may operate as a primary storage array R1 or backup storage array R2 in many mirroring pairs, and hence multiple RDR applications 155 may simultaneously execute on storage system 100 to control participation of the storage array 130 in the mirroring operations of multiple remote data replication facilities.

Data transfer among storage systems 100, including transfers between storage arrays 130 for data replication (mirroring) functions, may take place in several ways depending on how the primary storage system handles data written by the host 102 and how the backup storage system R2 acknowledges receipt of data on the remote data replication facility. Two example data mirroring modes will be referred to herein as synchronous (SYNC) and asynchronous (ASYNC). Where data transfers occur between storage arrays 130, data transfer can take place over a communication network connecting the storage arrays 130, such as a Fibre Channel network or an Internet Protocol (IP) network.

In synchronous RDR data replication mode, to maintain a synchronous relationship between the primary storage array R1 and the backup storage array R2, each IO from the host 102 is forwarded by the primary storage array R1 to the backup storage array R2 as it is received from host 102, and the primary storage array R1 will wait for an acknowledgment from the backup storage array R2 before issuing a subsequent IO from the host 102. In this manner, the primary storage array R1 and backup storage array R2 are able to maintain a synchronized view of the host data.

In an asynchronous RDR data replication mode, when a write IO is received from host 102, the data is written to the primary storage array R1 and a data transfer process is initiated to write the data to the backup storage array R2 on the remote data replication facility. The primary storage array R1 acknowledges the write operation to the host 102 before the primary storage array R1 has received an acknowledgement that the data has been received by the backup storage array R2. The use of asynchronous data replication thus enables the data on the primary storage array R1 and backup storage array R2 to be one or more cycles out of synchronization, because the primary storage array R1 will continue to execute IOs prior to receipt of acknowledgments from the backup storage array R2. The use of asynchronous replication may be beneficial in connection with sites located geographically distant from each other, for example where the distance between the primary storage array R1 and the backup storage array R2 is such that waiting for an acknowledgement from the backup storage array R2 would take considerable time and, hence, reduce responsiveness of the primary storage array R1 to the host 102.

By mirroring host data from a primary storage array R1 to one or more backup storage arrays R2, it is possible to provide the host 102 with continued access to host data in the event of a failure of the primary storage array. As used herein, the term "role reversal" will be used to refer to a process of switching responsibility for servicing host IO requests between a primary storage array R1 and a backup storage array R2. A first type of "role reversal" is commonly referred to as failover. Failover occurs when responsibility for servicing host IO requests switches from the primary storage array R1 to the backup storage array R2. A second type of "role reversal" is commonly referred to as failback. Failback occurs when responsibility for servicing host IO requests switches from the backup storage array R2 back to the primary storage array R1. Role reversal events may occur for various reasons, some of which are planned (such as disaster recovery testing), and others which are not planned (such as actual disaster events).

Figure 2:
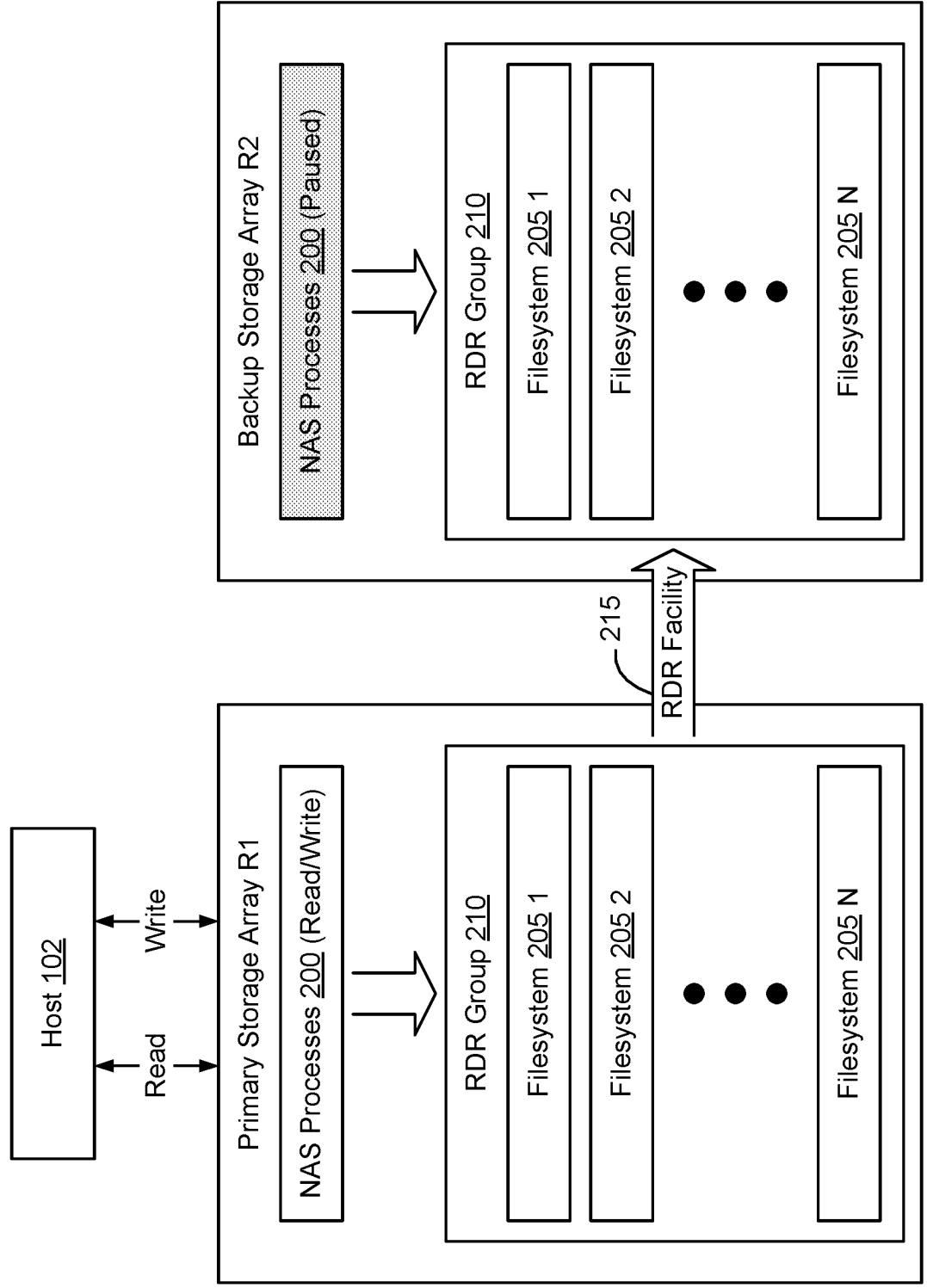
FIG. 2 is a functional block diagram illustrating an example remote data replication facility extending between a primary storage array R1 and a backup storage array R2 prior to failover, according to some embodiments.

FIG. 2 is a functional block diagram illustrating an example remote data replication facility extending between a primary storage array R1 and a backup storage array R2 prior to failover, according to some embodiments. As shown in FIG. 2, prior to failover the primary storage array R1 is implementing a set of Network Attached Storage (NAS) processes 200 that are set to enable both READ host IO operations and WRITE host IO operations. The NAS processes 200 may be software defined NAS processes, or other processes configured to provide host 102 access to data stored in filesystems 205. In some embodiments, a set of filesystems 205 is logically associated with a remote data replication group (RDR group) 210, and the remote data replication process 155 replicates the data that is included in the RDR group 210 on an RDR facility 215 to the backup storage array R2.

The backup storage array R2 is similarly configured, and also includes a corresponding set of NAS processes 200, RDR group 210, and filesystems 205. The NAS processes 200, however, are paused and are not used to implement IO operations from the host. In some embodiments, the NAS processes 200 on the backup storage array R2 may be set to READ only, such that the NAS processes on the backup storage array R2 will respond to read IO operations from host 102, but will not accept write IO operations from the host 102. However, for ease of explanation, some embodiments will be described in which the NAS processes 200 on the storage array that is not responsible for host IO operations will be described as being paused.

Figure 3:
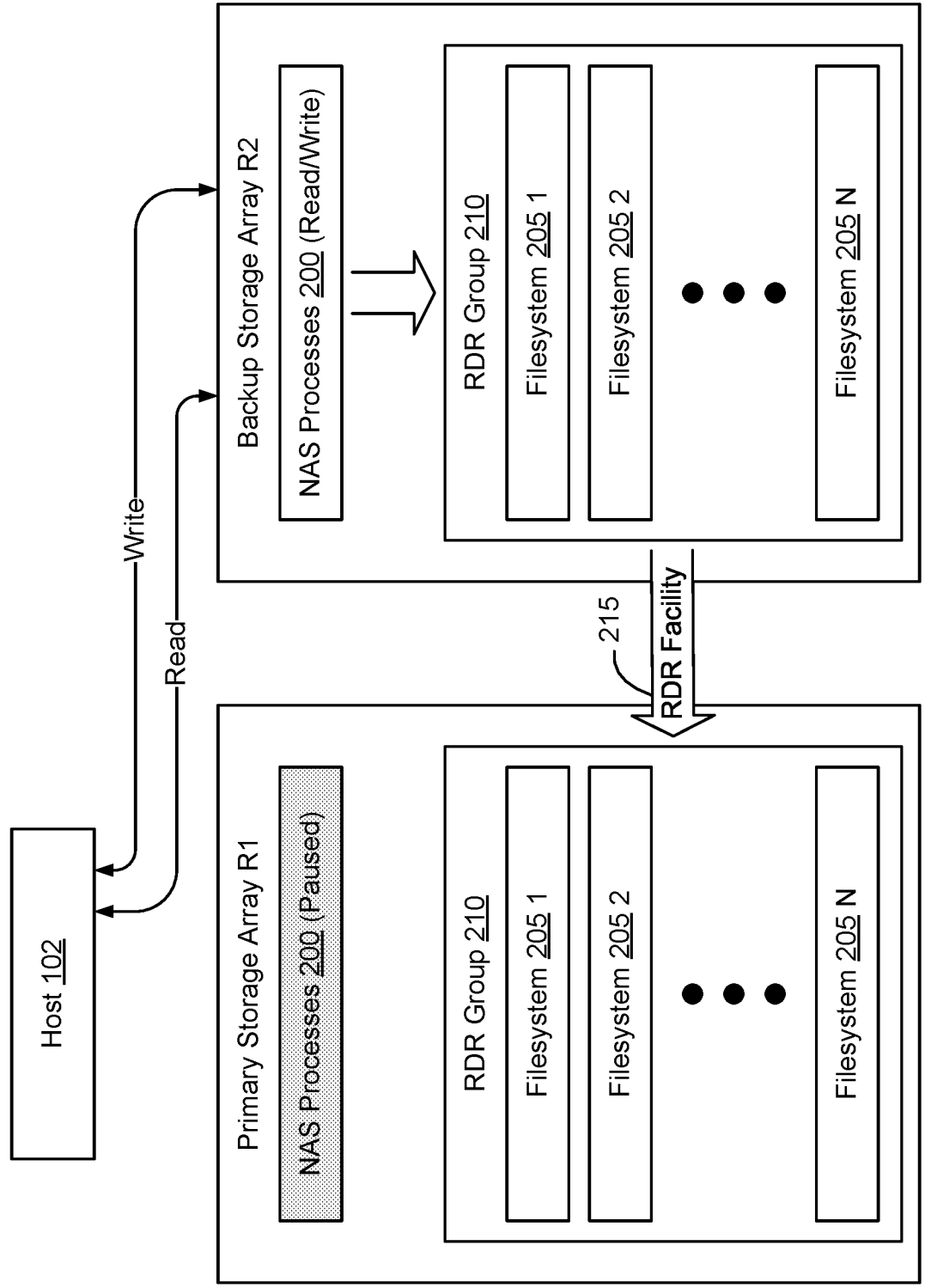
FIG. 3 is a functional block diagram illustrating an example remote data replication facility extending between a primary storage array R1 and a backup storage array R2 after failover, according to some embodiments.

FIG. 3 is a functional block diagram illustrating an example remote data replication facility extending between a primary storage array R1 and a backup storage array R2 after failover, according to some embodiments. As shown in FIG. 3, during failover, the NAS processes 200 on the backup storage array R2 are switched from being paused to being READ/WRITE enabled, such that the NAS processes 200 on the backup storage array R2 will respond to both read IO operations and write IO operations from host 102. After failover, the NAS processes 200 on the primary storage array R1 are paused.

Figure 4:
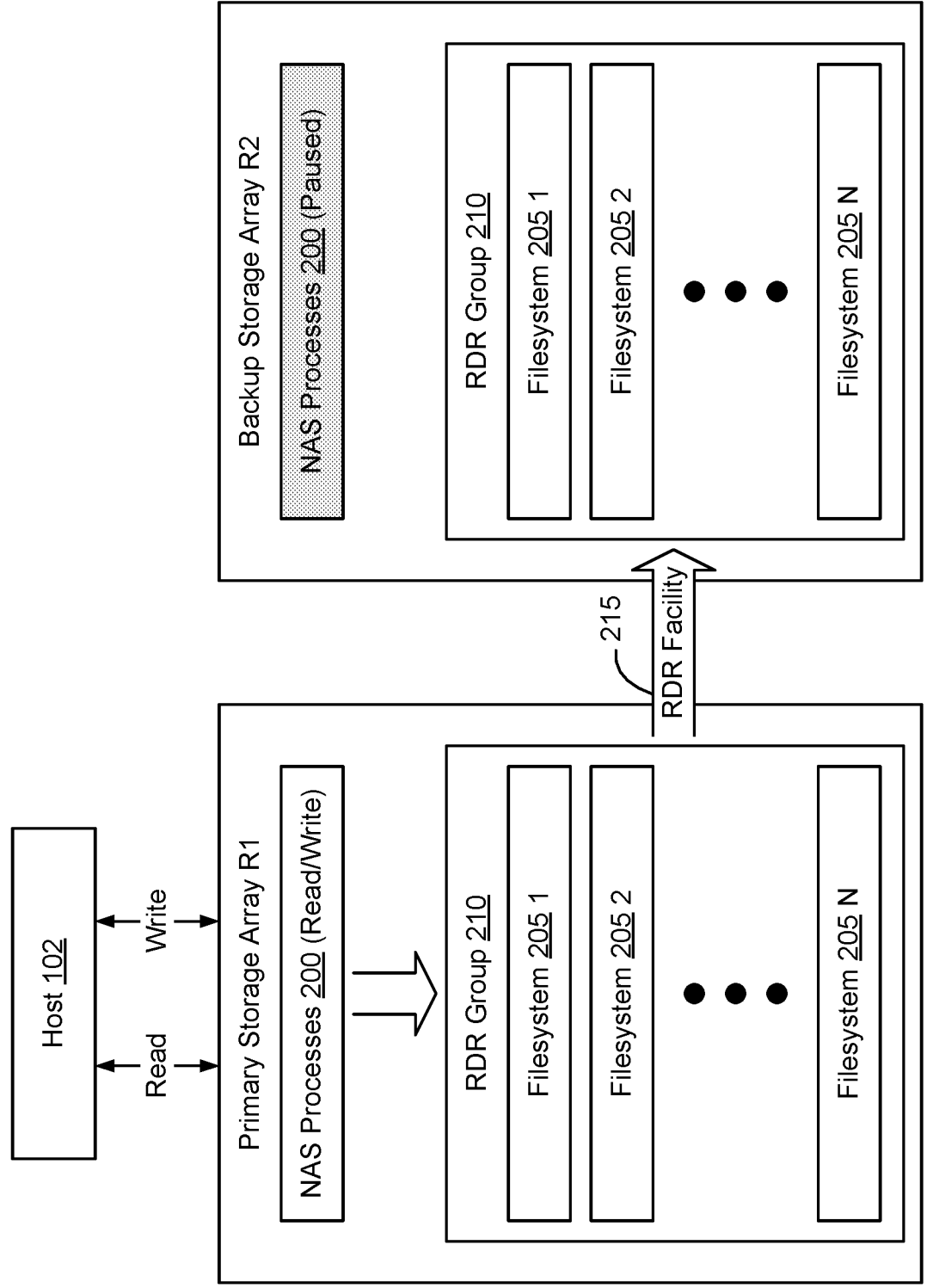
FIG. 4 is a functional block diagram illustrating an example remote data replication facility extending between a primary storage array R1 and a backup storage array R2 after failback, according to some embodiments.

FIG. 4 is a functional block diagram illustrating an example remote data replication facility extending between a primary storage array R1 and a backup storage array R2 after failback, according to some embodiments. As shown in FIG. 4, during failback responsibility for responding to read and write operations from the host 102 reverts once again to the primary storage array R1. The NAS processes 200 on the primary storage array R1 are switched from being paused to being READ/WRITE enabled, such that the NAS processes 200 on the primary storage array R1 will respond to both read IO operations and write IO operations from host 102. After failback, the NAS processes 200 on the backup storage array R2 are paused.

Any time there is a role reversal, such as a failover or failback, the host 102 will access the version of the data in filesystems 205 on the storage array where the NAS processes are READ/WRITE enabled. Unfortunately, there are instances where one or more of the tracks of one of the filesystems may be unsynchronized between the primary storage array R1 and the backup storage array R2. For example, if the good data is on the primary storage array R1 and, for some reason, one or more of the tracks of the data on the backup storage array R2 does not match the data stored on the primary storage array R1, failover from the primary storage array R1 to the backup storage array R2 will cause the host 102 to access bad data from the backup storage array R2.

There are many reasons why failover may occur. For example, in some instances customers in particular industry are required to periodically perform Disaster Recovery (DR) testing, for example by intentionally failing over from the primary storage array R1 to the backup storage array R2. During the disaster recovery testing, the hosts continue to access the data stored in the filesystems 205 1-N, until the disaster testing has completed. After successful failover, a subsequent role reversal will occur and to failback responsibility for responding to host IO operations back to the primary storage array R1.

During scheduled disaster recovery testing, or after an unscheduled disaster where a customer has failed over to the backup storage array R2, a customer (host 102) may report an error indicating that the failback operation resulted in an error. For example, during failback inline operations are merged from the R2 to the R1 array, and during this process a data consistency error may be identified. Although the error may be identified during failback, the data inconsistency actually was present prior to the disaster recovery exercise. The failure to failback can result in customer data loss, as the good data is on the primary storage array R1 and the customer has been running their production on the bad data stored on the backup storage array R2.

According to some embodiments, the primary storage array R1 and backup storage array(s) R2 on a remote data replication facility are configured to implement a process of data error identification prior to role reversal. In situations where there is sufficient time for a detailed data scan, a full scan of the data on the primary storage array R1 and backup storage array R2 is performed, to identify any differences in the data on the two arrays participating in the remote data replication facility. In situations where there is not sufficient time for a detailed data scan, a quick scan of metadata is used to identify possible differences between the data on the two arrays participating in the remote data replication facility. In some embodiments, the quick scan is based on data signatures for each track contained in metadata tables on the storage arrays. In some embodiments, the metadata tables may be implemented as a track index table. Additional details about the metadata 525 is described in connection with FIG. 6.

The purpose of DR testing should be to uncover issues and not to cause issues or make existing issues worse by proceeding with a failover test when unsafe to do so which then causes impact to the customer as the system was not in a healthy/clean state beforehand.

Furthermore, for the case of a real disaster where the customer fails over to the backup array R2, the customer may have sufficient warning time such as in the case of an oncoming hurricane, or data center cooling failure, gas leak etc., to perform a disaster recovery readiness tests and pre-scan. This would also be true for any oncoming disaster natural or otherwise where the customer has a window of warning time to execute data integrity testing prior to failover. The customer could also schedule this data integrity testing to be run on a regular basis and the tests themselves are more lightweight than having to actually perform a DR testing failover to verify their DR solution.

According to some embodiments, prior to performing a disaster recovery test, a disaster recovery readiness test is implemented by conducting a pre-scan prior to the actual DR Testing failover/failback. This enables any issues to be identified prior to the actual DR test where the customer fails over their production environment.

Additionally, in some embodiments a pre-scan is also conducted in instances where a customer has sufficient warning time ahead of a real disaster. For example, a customer may know several days in advance that a hurricane has the potential to affect the ability of the primary storage array to service host IO operations. As another example, the primary storage array might report a loss of cooling that will require shutdown in a fixed period of time. In both of these situations, it may be possible to perform either a full data scan or a quick data scan to identify data inconsistencies between the primary storage array R1 and backup storage array R2. If issues are encountered, customer support can be engaged to rectify the issues ahead of the oncoming disaster to thereby increase the likelihood that failover and failback will be able to be implemented successfully.

The disaster recovery readiness testing steps and pre-scan commands can be run prior to the failover if time allows. The customer can actually verify their disaster recovery solution before events call upon them to engage it. This way the customer can take action and have increased peace of mind when events out of their control are unfolding. If a problem is detected, the customer can either take action themselves or engage customer support to rectify any issue prior to failover. If the disaster recovery readiness tests and pre-scan generate a dialhome customer support request, then customer support may even automatically be engaged even sooner.

In some embodiments, disaster recovery readiness testing and pre-scan is configured to run a series of simulated tests such as a simulated merge of tables from a simulated failover perspective. In other words, this would involve the R2 volume(s) virtually taking on the role of R1 volume(s) and vice versa for a simulated set of commands and tests such as a simulated merge of tables. Such testing would then uncover any latent issues that could themselves cause significant delay, impact, data loss and disruption to the customer if the customer had proceeded with the disaster recovery testing without executing these disaster recovery readiness testing steps.

In some embodiments, during disaster recovery readiness testing, the backup storage array R2 is configured to assume the role of the primary storage array R1 virtually for these simulated tests. If necessary, temporary suspension of IO traffic from primary storage array R1 to backup storage array R2 for the duration of the test may be required or the simulated testing commands could be queued such that they occur between data cycle switches from primary storage array R1 to backup storage array R2 where cycle switching is suspended momentarily by the array operating system 150 until the commands complete.

In some embodiments, when the customer initiates their normal disaster recovery testing, the customer is presented with a display, for example via management system 160, showing them when the last disaster recovery readiness testing tests and pre-scan was executed and, if it has been longer than a specific period, the customer optionally may be prompted to initiate disaster recovery readiness testing prior to implementing the actual disaster recovery test.

By implementing disaster recovery readiness testing prior to implementing disaster recovery tests, it is possible to identify existing issues before executing the disaster recovery test, rather than only discovering the issues after performing an actual failover/failback. By implementing disaster recovery readiness testing and pre-scan to help prevent a failure to failback after DR testing is exercised, corruption issues or even code issues that cause data mismatch type errors can be detected and brought to light sooner and fixed sooner without customer impact.

Figure 5:
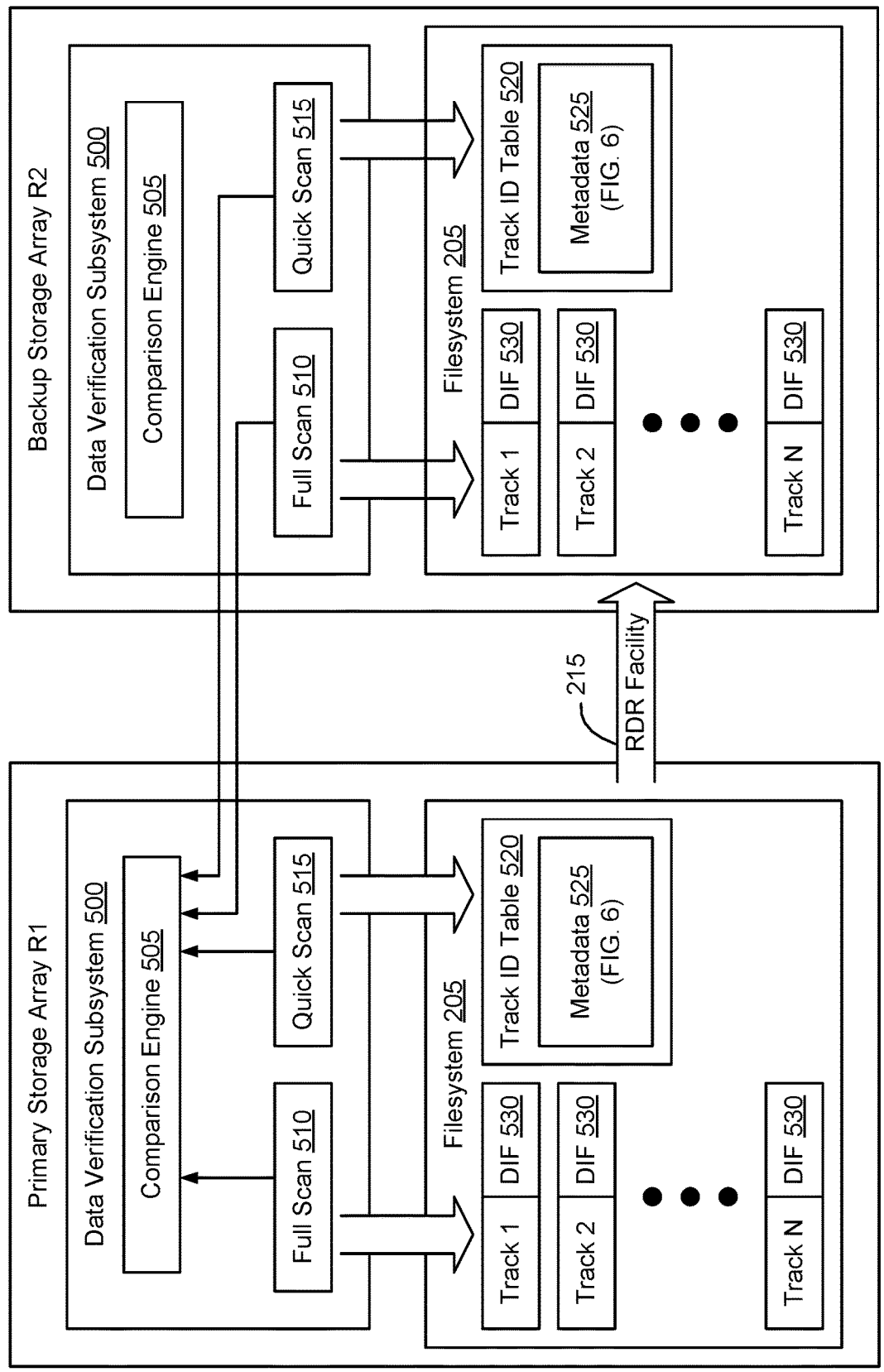
FIG. 5 is a functional block diagram illustrating an example remote data replication facility extending between a primary storage array R1 and a backup storage array R2, in which the storage arrays are configured to implement a process of data error identification prior to role reversal on the remote data replication facility, according to some embodiments.

FIG. 5 is a functional block diagram illustrating an example remote data replication facility extending between a primary storage array R1 and a backup storage array R2, in which the storage arrays are configured to implement a process of data error identification prior to role reversal on the remote data replication facility, according to some embodiments. As shown in FIG. 5, in some embodiments the primary storage array R1 includes a data verification subsystem 500. The data verification subsystem includes a comparison engine 505 configured to compare information about the filesystem 205 stored on the primary storage array R1 and information about filesystem 205 stored on the backup storage array R2. As shown in FIGS. 2-4, a given RDR group 210 may include multiple filesystems 205. FIG. 5 shows an example in which the RDR group associated with the RDR facility 215 includes a single filesystem 205 for ease of illustration.

In some embodiments, the comparison engine is configured to perform a full scan 510 that compares the data stored on the tracks of each of the filesystems 205 in the RDR group 210 on the primary storage array R1 with the data stored on the tracks of each of the filesystems 205 in the RDR group 210 on the backup storage array R2.

When a track of data is stored in storage resources 132 of a storage array 130, a Data Integrity Field (DIF) 530 is created for the track. In some embodiments, an 8-byte DIF value is calculated based on the content of the track. The 8-byte value is stored with the track, and used to ensure that the track data does not change as the data is moved through the storage system 100. In some embodiments, the comparison engine 505 implements a full scan 510 by reading the DIF 530 of each track on the primary storage array R1, reading the DIF 530 for the corresponding track from the backup storage array R2, and comparing the DIF values for the track. If there is a difference, the comparison engine 505 determines that the data stored in the track of the backup storage array R2 is different than the data stored in the track on the primary storage array R1.

Because implementing a full scan 510 requires the comparison engine 505 to read the DIF values from both the primary storage array R1 and the backup storage array R2 for all tracks of all filesystems 205 in the RDR group 210, implementing a full scan may take a considerable amount of time. For example, scanning 16*200 GB R1 volumes (26 Million tracks) was found to take on the order of 32 hours. However, doing a full scan is very accurate and able to precisely detect differences in data between the primary storage array R1 and backup storage array R2. In instances where there is sufficient time and bandwidth, implementing a full scan 510 might be preferable prior to implementing a role reversal, such as in connection with disaster testing.

There are times when implementing a full scan 510 might not be possible. For example, there are occasions where failover is required to be implemented within minutes. For example, if a situation occurs such as a loss of cooling at a data center, a failover event might need to occur within 5-10 minutes. On these occasions, it still would be advantageous to quickly determine if there are any apparent data inconsistencies between the data on the backup storage array R2 and the data on the primary storage array R1.

According to some embodiments, a quick scan 515 is used to compare metadata 525 of the tracks contained in the track ID table 520 on the primary storage array R1 with metadata 525 of the tracks contained in the track ID table 520 on the backup storage array R2. Additional details about the metadata 525 is described in connection with FIG. 6. By comparing track signatures for each track contained in the track ID table 520 on the primary storage array R1 with track signatures for each corresponding track contained in the track ID table 520 on the backup storage array R1, it is possible to determine if there are any differences in data between the primary storage array R1 and backup storage array R2. In some embodiments the track signatures are not as detailed as the DIF 530, and hence the quick scan is not guaranteed to detect all data errors. However, in many instances a difference in data will be reflected in the track signatures and, accordingly, implementing a quick scan 515 is able to detect most errors and is thus preferable to performing no data error identification process prior to role reversal.

Figure 6:
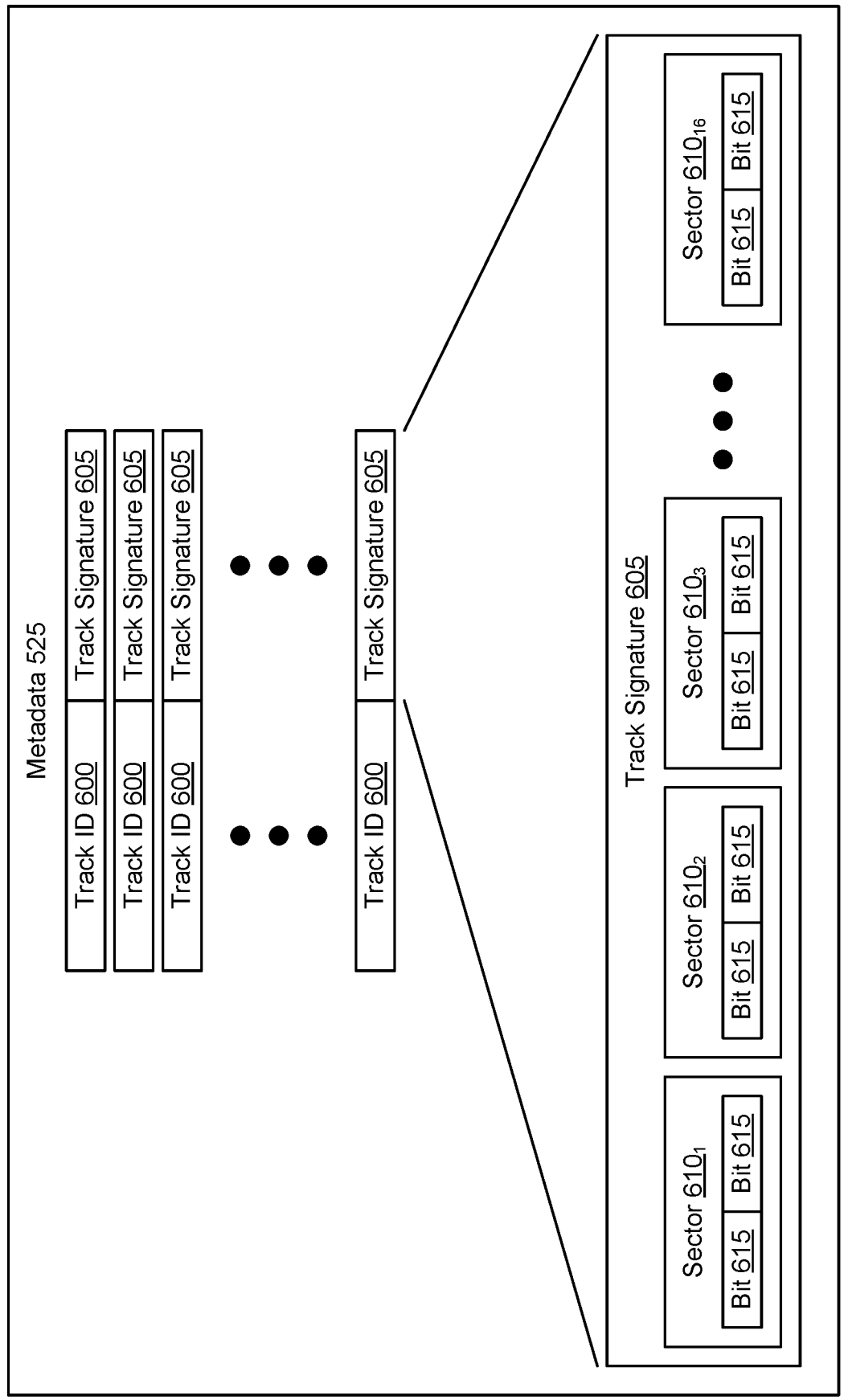
FIG. 6 is a functional block diagram of an example metadata table used to implement a quick scan of data on the primary storage array R1 and a backup storage array R2 to implement a process of data error identification prior to role reversal on the remote data replication facility, according to some embodiments.

FIG. 6 is a functional block diagram of an example metadata table used to implement a quick scan of data on the primary storage array R1 and backup storage array R2 to implement a process of data error identification prior to role reversal on the remote data replication facility, according to some embodiments. As shown in FIG. 6, in some embodiments the metadata 525 contained in the track ID table 520 includes an entry for each track ID 600 and a track signature 605. The track signature 605, in some embodiments, is created based on the version of the data contained in the sectors of the track. In some embodiments, each track is stored on 16 disc sectors. A two-bit value is created for each of the 16 sectors, and these two-bit values are concatenated to form the track signature 605. Accordingly, in some embodiments each track signature is a 32-bit value (4 bytes) that contains 16 sector values (2 bits each) that are individually incremented whenever a respective sector is updated in connection with a write IO to the sector.

In some embodiments, each time data of a particular sector (block) is updated, the sector signature value associated with that block is incremented. The sector signature for each block in the track can therefore be incremented four times before rolling over and starting again. By checking to determine whether the track signatures for a given track on the primary and backup arrays are the same, it is possible to determine whether each of the blocks of the track has been updated the same number of times on both the primary and storage arrays. By identifying instances where the signature for a given track is different on the backup array than on the primary array, it is possible to identify tracks where an update might have been missed on the backup array and, hence, a possible data mismatch between the primary and backup arrays. Although some embodiments are described where the track signatures are based on the version of the data contained in the sectors of the track, it should be understood that other track signatures may be contained in the metadata 525 depending on the implementation. For example, rather than updating the two-bit value for each block each time data is written to the block, it may be possible to create a two bit value for the block using a Cyclic Redundancy Check (CRC) based on the data contained in the sector of the track.

The quick scan process 515 reads the metadata 525 on the primary storage array R1, reads the metadata 525 from the backup storage array R2, and performs a track-by-track comparison of the R1 metadata and R2 metadata to identify any differences in the metadata. In some embodiments, the quick scan process 515 identifies differences in metadata but does not take any corrective action to fix any tracks. As such, the quick scan process 515 is implemented by doing a track signature comparison between tracks on the primary storage array R1 and the backup storage array R2 without merging of invalids or otherwise synchronizing any data found to be out of synchronization.

FIG. 5 shows the comparison engine 505 on the primary storage array R1 being used to implement the full scan 510 and/or quick scan 515. It should be understood that the comparison engine 505 on the backup storage array R2 could alternatively be used to implement the full scan 510 and/or the quick scan 515. Further, in some embodiments, the primary storage array R1 and the backup storage array R2 coordinate to implement portions of the full scan 510 and/or quick scan 515 in parallel. For example, the comparison engine 505 on the primary storage array R1 might be used to perform a quick scan 515 on a first set of filesystems $205_1$-$205_{N/2}$, and the comparison engine 505 on the backup storage array R2 might be used to perform a quick scan 515 on a second set of filesystems $205_{N/2+1}$-$205_N$. By implementing partial scans in parallel by the comparison engines on each of the primary storage array R1 and backup storage array R2, it may be possible to reduce the total amount of time required to implement a full scan 510 and/or quick scan 515.

Figure 7:
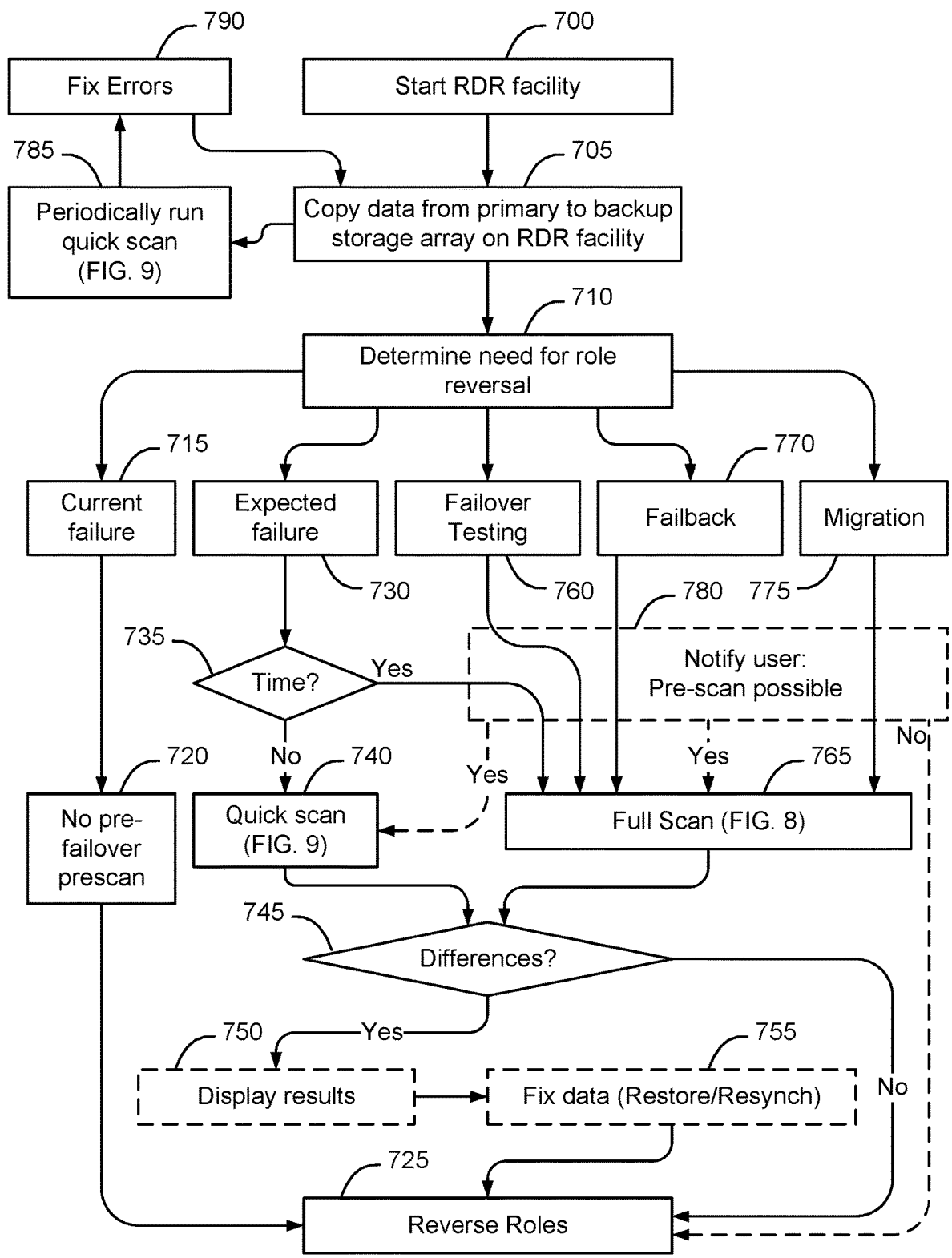
FIG. 7 is a flow chart of an example process of data error identification prior to role reversal on the remote data replication facility, according to some embodiments.

FIG. 7 is a flow chart of an example process of data error identification prior to role reversal on the remote data replication facility, according to some embodiments. As shown in FIG. 7, an RDR facility is started (block 700) on which data associated with a set of filesystems 205 is copied from a primary storage array R1 to a backup storage array R2 (block 705). A determination is then made to reverse roles on the RDR facility (block 710).

FIG. 7 shows several example process flows that may be implemented depending on the reason for the role reversal. For example, some role reversal operations are associated with failover operations that are required to be implemented due to a current failure of the primary storage array R1 (block 715). When the primary storage array R1 experiences failure, no pre-failure scan is often possible (block 720). For example, if the primary storage array R1 experiences failure, it might not be possible to access the data that was previously stored on the primary storage array R1, or the metadata that was previously stored on the primary storage array R1, so a comparison between the R1 data and R2 data (quick scan or full scan) is not possible. Accordingly, in some embodiments, upon occurrence of an actual disaster at the primary storage array R1 the role reversal is implemented without a pre-scan (block 725).

There are other role reversal operations that might involve additional lead time that will enable a pre-scan and other testing to be implemented prior to role reversal. For example, if there is an expected failure of the primary storage array R1 (block 730) it might be possible to do either a quick scan (block 740) or a full scan (block 765) depending on the amount of time (block 735) before failure is expected to occur. For example, if the failure is expected to occur in connection with an upcoming weather event such as a hurricane, the expected failure event might be several days away. In this situation, it may be possible to implement a full scan (block 765) to identify any data inconsistencies between primary storage array R1 and backup storage array R2 on a remote data replication facility prior to role reversal. As described in greater detail in connection with FIG. 8, in some embodiments a full scan (block 765) can be implemented by comparing the DIF of each track on the backup storage array R2 with the DIF of the corresponding track on the primary storage array R1.

If the failure is expected to occur within several minutes, an hour, or another period of time that is less than an estimated amount of time that the comparison engine 505 would require to complete a full scan, a quick scan (block 740) and other tests may be used to identify data inconsistencies between primary storage array R1 and backup storage array R2 on a remote data replication facility prior to role reversal. As described in greater detail in connection with FIG. 9, in some embodiments a quick scan (block 740) can be implemented by comparing the track signature of each track contained in metadata stored for the track in the track index table on the backup storage array R2 with the corresponding track signature contained in metadata stored for the track in the track index table on the primary storage array R1.

In some embodiments, when a role reversal operation is initiated by a user, for example in connection with an expected failure, a notification may optionally be generated (block 780) to notify the user that it is possible to implement a pre-scan before implementing the role reversal, and to provide the user with options of selecting to execute either a quick scan (block 740) or a full scan (block 765). The notification may also provide the user with an option to not implement either scan, and to go straight to the role reversal (block 725). In some embodiments, the notification (block 780) includes an estimate of an amount of time it is expected to take to implement the quick scan (block 740) and the full scan (block 765). In some embodiments, the comparison engine 505 is configured to periodically run the quick scan (block 785) to identify any errors that can then be fixed (block 790) independently of any determination to implement role reversal (block 710). In some embodiments, the notification (block 780) includes an indication of when a most recent quick scan was implemented on the data (block 785) to enable the user to more intelligently determine whether to implement a quick or full scan prior to the role reversal.

As shown in FIG. 7, in addition to actual current failure of the primary storage array R1 (block 715) or expected failure of the primary storage array (block 730), there are other types of role reversals that can utilize either the quick scan (block 740) or full scan (block 765). For example, failover testing (block 760) is periodically implemented by some customers to test the disaster recovery systems. Depending on the industry, disaster recovery testing might be required by governmental regulations. Because disaster recovery testing is a scheduled event that is known in advance, in some embodiments when a user instructs the primary storage array R1 via management system 160 to implement disaster recovery testing (block 760), the primary storage array R1 generates a notification (block 780) that a pre-failover scan will be initiated and provides an estimate of when the scan will be completed.

Another role reversal scenario occurs in connection with failback (block 770). During failback, responsibility for handling host IO operations transfers from the backup storage array R2 to the primary storage array R1. Failback operations may be planned in advance, and hence implementing a full scan (block 765) may be implemented upon receipt of a failback command (block 770) and prior to implementation of a failback operation (block 725).

Remote data replication can be used to migrate data (block 775) from a first storage array to a second storage array. For example, if host data needs to be moved from the first storage array to the second storage array, to enable the second storage array to be used to store the host data, it is possible to set up a remote data replication facility 215 between the first and second storage arrays. Then, once all the host data has been synchronized from the primary storage array R1 to the backup storage array R2, a migration event can be implemented to switch responsibility for host IO operations to the backup storage array R2. Once migration has occurred, the backup storage array R2 becomes responsible for host IO operations and, optionally, the remote data replication facility 215 can be ended. Because migration events can be planned in advance, in some embodiments a full scan is implemented (block 765) after data has been copied from the primary storage array R1 to the backup storage array R2, but prior to implementation of the actual data migration (block 725).

Although FIG. 7 shows a full scan being preferentially selected in connection with failover testing (block 760), failback (block 770), or migration (block 775), it should be understood that the type of scan (quick scan vs full scan or no scan) can be user selected, for example in response to the notification (block 780). For example, if a user has just implemented a full scan to prepare for failover in connection with disaster testing, the user might select to implement no scan or a quick scan (block 740) in connection with failback since the likelihood of having a data error might be viewed as relatively low.

When a scan option is selected (full scan or quick scan), the comparison engine 505 executes the selected scan type to identify any differences in the data stored on the primary storage array R1 and the data stored on the backup storage array R2 (block 745). If no differences are found (a determination of NO at block 745) role reversal can proceed (block 725). If differences are found (a determination of YES at block 745), optionally the scan results can be displayed (block 750) and the data can be fixed (block 755) for example by restoring the tracks of data that exhibited a mismatch from R1 to R2, or by resynchronizing the tracks of data that were identified by the scan to be different on the backup storage array R2 than on the primary storage array R1. It should be noted that, in some embodiments, fixing the data is implemented separately from scanning the data. Once the data has been fixed (block 755) role reversal can proceed (block 725).

By identifying data inconsistencies between primary storage array R1 and backup storage array R2 on a remote data replication facility prior to role reversal, it is possible to reduce the number of data mismatch errors to thereby increase the likelihood that the role reversal will be successful between primary storage array R1 and backup storage array R2 of the remote data replication facility.

Figure 8:
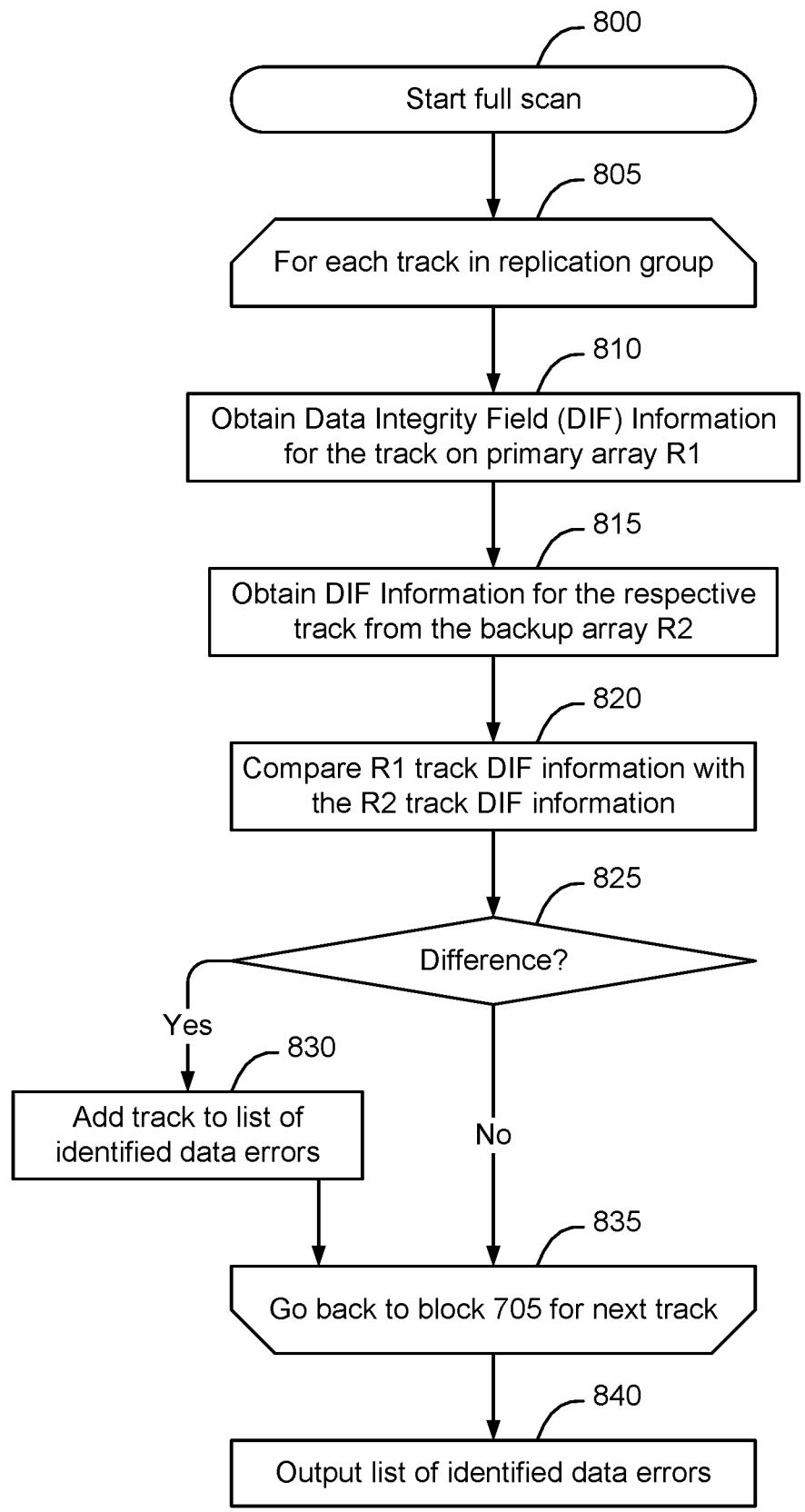
FIG. 8 is a flow chart of an example process of implementing a full scan to identify data inconsistencies between primary storage array R1 and a backup storage array R2 on a remote data replication facility prior to role reversal, according to some embodiments.

FIG. 8 is a flow chart of an example process of implementing a full scan to identify data inconsistencies between primary storage array R1 and backup storage array R2 on a remote data replication facility prior to role reversal, according to some embodiments. As shown in FIG. 8, a decision is made to start a full scan of tracks of data included in a set of filesystems 205 of a remote data replication group 210 (block 800).

For each track in the replication group 210 (block 805), the comparison engine 505 obtains the Data Integrity Field (DIF) information for the track on the primary storage array R1 (block 810). The comparison engine 505 also obtains the Data Integrity Field (DIF) information for the track on the backup storage array R2 (block 815). The comparison engine 505 compares the R1 track DIF information with the R2 track DIF information (block 820) to make a determination as to whether there is a difference between the DIF information for the track on the primary storage array R1 and backup storage array R2 (block 825).

If a difference is detected by the comparison engine 505 (a determination of YES at block 825), a track identification value of the respective track is added to a list of identified data errors (block 830). If a difference is not detected by the comparison engine 505 (a determination of NO at block 825), or after the track ID has been added to the list of identified data errors (block 830) the comparison engine proceeds to process the next track (block 835). Once all tracks have been processed, the comparison engine outputs the list of identified data errors (block 840).

Figure 9:
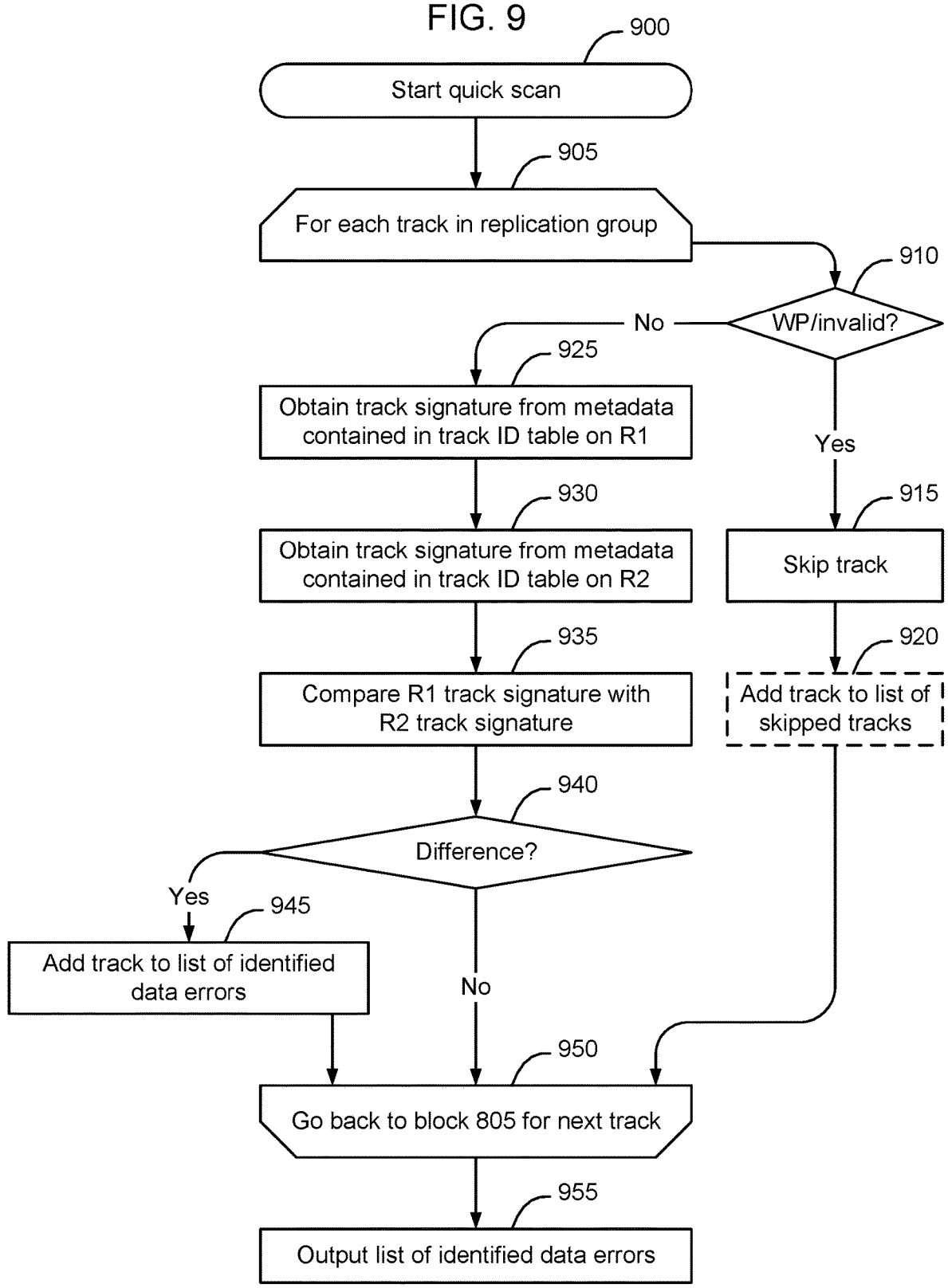
FIG. 9 is a flow chart of an example process of implementing a quick scan to identify data inconsistencies between primary storage array R1 and a backup storage array R2 on a remote data replication facility prior to role reversal, according to some embodiments.

FIG. 9 is a flow chart of an example process of implementing a quick scan to identify data inconsistencies between primary storage array R1 and backup storage array R2 on a remote data replication facility prior to role reversal, according to some embodiments. As shown in FIG. 9, a decision is made to start a quick scan of tracks of data included in a set of filesystems 205 of a remote data replication group 210 (block 900).

For each track in the replication group 210 (block 905), the comparison engine 505 determines if the track is currently write pending or marked as invalid (block 910). In response to a determination that the track is write pending or marked as invalid (a determination of YES at block 910), in some embodiments the comparison engine skips the track (block 915). Optionally, the track that was skipped may be added to a list of skipped tracks (block 920).

If the track is not write pending or marked as invalid on the primary storage array R1 (a determination of NO at block 910), the comparison engine 505 obtains the track signature from metadata contained in the track ID table 520 on the primary storage array R1 (block 925). The comparison engine 505 also obtains the track signature from metadata contained in the track ID table 520 on the backup storage array R2 (block 930). The comparison engine 505 compares the R1 track signature with the R2 track signature (block 935) to make a determination as to whether there is a difference between the track signature for the track on the primary storage array R1 and backup storage array R2 (block 940).

If a difference is detected by the comparison engine 505 (a determination of YES at block 940), a track identification value of the respective is added to a list of identified data errors (block 945). If a difference is not detected by the comparison engine 505 (a determination of NO at block 940), or after the track ID has been added to the list of identified data errors (block 945) the comparison engine proceeds to process the next track (block 950). Once all tracks have been processed, the comparison engine outputs the list of identified data errors (block 955). Optionally, the comparison engine 505 may also output the list of skipped tracks.

The preceding discussion has focused on a scenario in which two sites are used to implement a Remote Data Replication facility on which data is replicated data from a primary storage array R1 to a single backup storage array R2. It is possible for a remote data replication facility to include multiple backup storage arrays, for example by using concurrent or cascaded RDR R1/R2 pairings.

Figure 10:
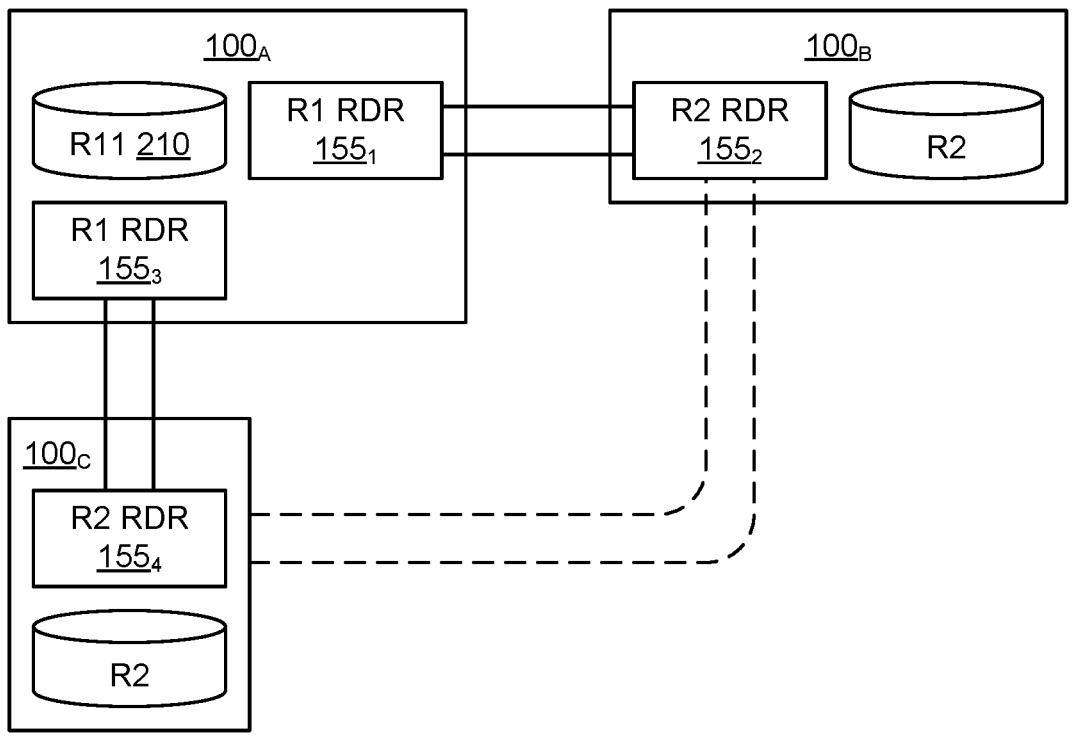
FIG. 10 is a functional block diagram illustrating an example multi-site remote data replication facility implemented using three storage arrays as a concurrent star topology, according to some embodiments.

FIG. 10 is a functional block diagram illustrating an example multi-site remote data replication facility implemented using three storage arrays as a concurrent star topology, according to some embodiments. As shown in FIG. 10, in a concurrent star topology, the replication data group 210 on the primary storage array R1 is the source of data that is replicated on two R1/R2 remote data replication sessions. Specifically, a first R1 RDR process $155_1$ on storage array $100_A$ mirrors the tracks of the replication data group 210 to a R2 RDR process $155_2$ on storage array $100_B$. Concurrently, a second R1 RDR process $155_3$ on storage array $100_A$ mirrors the tracks of the replication data group 210 to a R2 RDR process $155_4$ on storage array $100_C$. Using concurrent RDR processes to mirror the replication data group to two backup storage arrays R2 enables two copies of the replication data group 210 on the primary storage array R1 to be available on two separate backup sites, for example for use in disaster recovery.

Figure 11:
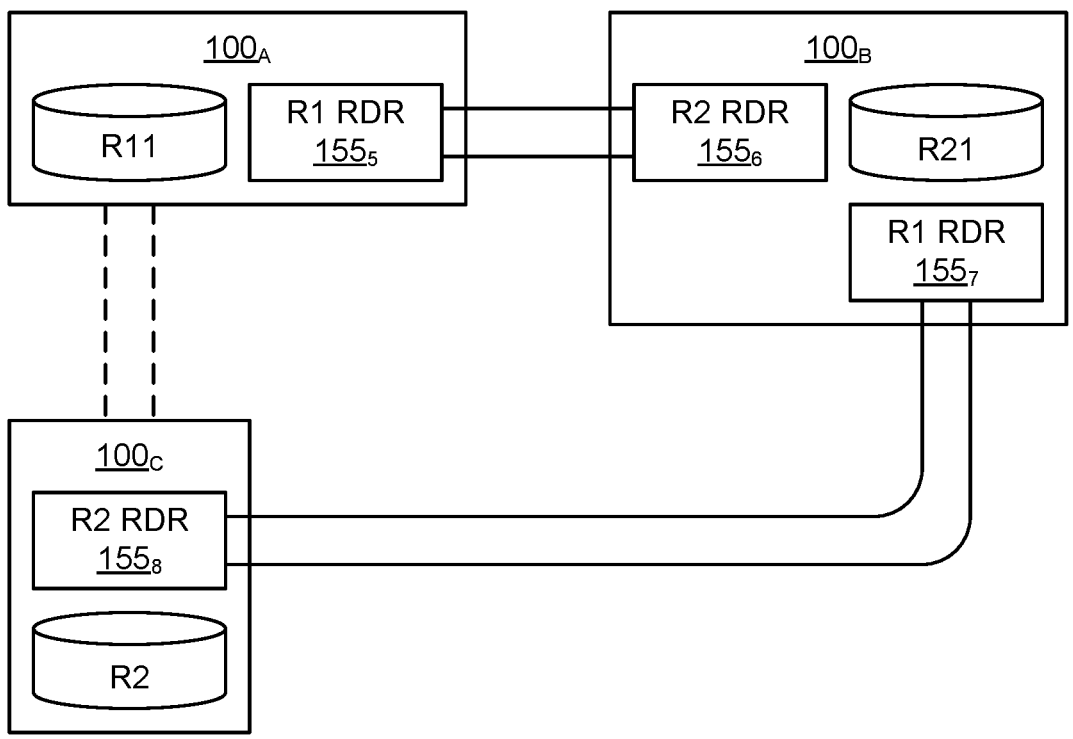
FIG. 11 is a functional block diagram illustrating an example multi-site remote data replication facility implemented using three storage arrays as a cascaded star topology, according to some embodiments.

FIG. 11 is a functional block diagram illustrating an example multi-site remote data replication facility implemented using three storage arrays as a cascaded star topology, according to some embodiments. As shown in FIG. 10, in a cascaded star topology, the replication data group 210 on the primary storage array $100_A$ is the source of data that is replicated on a first R1/R2 remote data replication session to a backup storage array R2. Specifically, a first R1 RDR process $155_5$ on storage array $100_A$ mirrors the tracks of the replication data group 210 to a R2 RDR process 1556 on storage array $100_B$. A second R1 RDR process $155_7$ on storage array $100_B$ then mirrors the tracks of the replication data group 210 to a R2 RDR process 1558 on storage array $100_C$. Using cascaded RDR processes to mirror the replication data group to a first backup storage array R2 $100_B$, and then from that backup storage array $100_B$ to a second backup storage array $100_C$, enables two backup copies of the replication data group 210 on the primary storage array R1 to be available on two separate backup sites, for example for use in disaster recovery.

Figure 12:
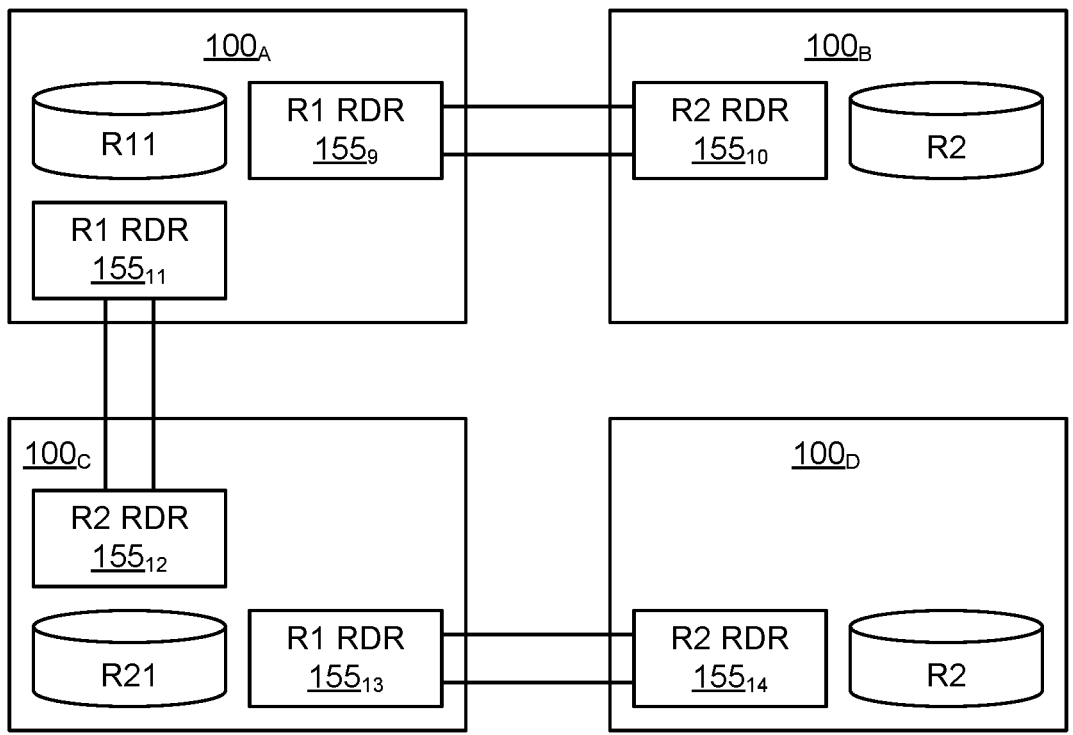
FIG. 12 is a functional block diagram illustrating an example multi-site remote data replication facility implemented using four storage arrays with both concurrent and cascaded topologies, according to some embodiments.

FIG. 12 is a functional block diagram illustrating an example multi-site remote data replication facility implemented using four storage arrays with both concurrent and cascaded topologies, according to some embodiments. In FIG. 12 a first R1 RDR process $155_9$ mirrors the tracks of the replication data group 210 to a R2 RDR process $155_{10}$ on storage array $100_B$. A second R1 RDR process $155_{11}$ on primary storage array $100_A$ concurrently mirrors the tracks of the replication data group 210 to a R2 RDR process $155_{12}$ on storage array $100_C$. A third R1 RDR process $155_{13}$ on storage array $100_C$ cascades the tracks of the replication data group 210 to a R2 RDR process $155_{14}$ on storage array $100_D$. Using this topology enables three backup copies of the data of the replication data group 210 on the primary storage array R1 to be available on three separate backup sites, for example for use in disaster recovery.

Figure 13:
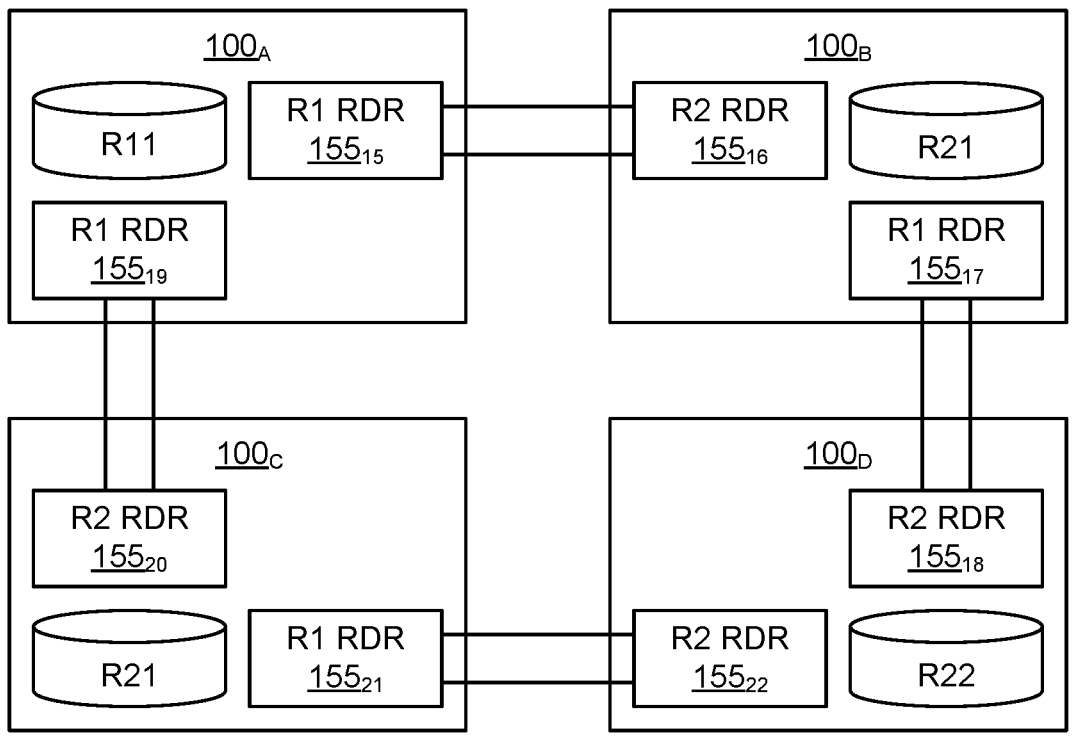
FIG. 13 is a functional block diagram illustrating an example multi-site remote data replication facility implemented using four storage arrays with dual cascaded topologies, according to some embodiments.

FIG. 13 is a functional block diagram illustrating an example multi-site remote data replication facility implemented using four storage arrays with dual cascaded topologies, according to some embodiments. In FIG. 13 a first R1 RDR process $155_{15}$ mirrors the tracks of the replication data group 210 to a R2 RDR process $155_{16}$ on storage array $100_B$. A second R1 RDR process $155_{17}$, on storage array $100_B$, cascades the tracks of the replication data group 210 to a R2 RDR process $155_{18}$ on storage array $100_D$.

A third R1 RDR process $155_{19}$, on primary storage array $100_A$, concurrently mirrors the tracks of the replication data group 210 to a R2 RDR process $155_{20}$ on storage array $100_C$. A fourth R1 RDR process $155_{21}$, on storage array $100_C$, cascades the tracks of the replication data group 210 to a R2 RDR process $155_{22}$ on storage array $100_D$. Using this topology enables three backup copies of the data of the replication data group 210 on the primary storage array R1 to be available on three separate backup sites, for example for use in disaster recovery.

Figure 14:
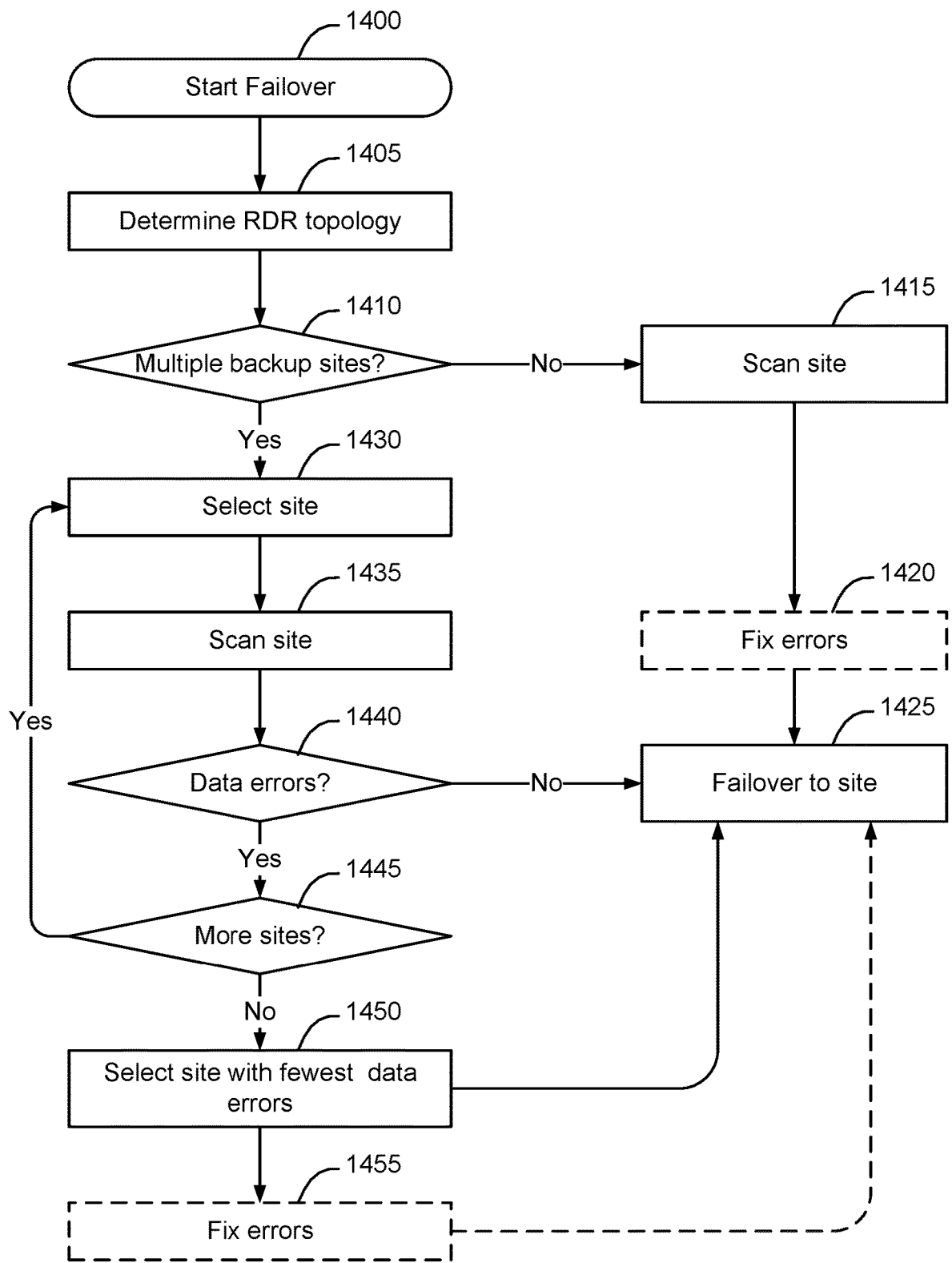
FIG. 14 is a flow chart of an example process of using data error identification to select a backup site in a multi-site remote data replication facility prior to failover on the remote data replication facility, according to some embodiments.

FIG. 14 is a flow chart of an example process of using data error identification to select a backup site in a multi-site remote data replication facility prior to failover on the remote data replication facility, according to some embodiments. As shown in FIG. 14, in some embodiments the quick scan and full scan processes described herein are able to be implanted and used to select a backup copy of data in instances where there are two or more backup copies of the data of the replication data group 210 on two or more backup storage arrays R2 in the RDR facility. For example, if a star topology of FIG. 10 or 11 is used to create two backup copies of the data of the replication data group 210, a scan can be used to identify which of the two copies has the fewest errors. Likewise, if a square topology of FIG. 12 or 13 is used to create three backup copies of the data of the replication data group 210, a scan can be used to identify which of the three copies has the fewest errors.

As shown in FIG. 14, when failover is initiated (block 1400), the topology of the RDR facility is determined (block 1405). Specifically, in some embodiments, a determination is made as to whether there are multiple backup sites (block 1410). If there are not multiple backup sites (a determination of NO at block 1410), the single backup site is scanned (block 1415), optionally any identified errors are corrected (block 1420), and the failover operations are implemented to failover to the single backup site (block 1425).

If there are multiple backup sites (a determination of YES at block 1410), in some embodiments a backup site is selected (block 1430) and the comparison engine 505 scans the selected backup site (block 1435). A determination is then made if there are any data errors on the preferred backup site (block 1440). In response to a determination by the comparison engine that there are no data errors (a determination of NO at block 1440), failover operations are implemented to failover to the selected backup site (block 1425).

In response to a determination by the comparison engine that there are data errors on the preferred site (a determination of YES at block 1440), in some embodiments a determination is made as to whether there are additional backup sites (block 1445). In response to a determination that there are additional backup sites that have not been scanned (a determination of YES at block 1445) an alternative backup site is selected (block 1430) and the comparison engine is used to scan the alternative backup site (block 1435). If no errors are identified on the alternative backup site (a determination of No at block 1440), failover operations are implemented to failover to the alternate backup site (block 1425).

In some embodiments the comparison engine 505 processes alternative backup sites until a backup site has been identified that does not have any data errors (a determination of NO at block 1440) or until all backup sites have been scanned (a determination of NO at block 1445). In instances where all backup sites are determined to have at least some data errors (a determination of NO at block 1445), in some embodiments the backup site with the fewest errors is selected for failover (block 1450). Optionally the data errors are fixed (block 1455), and failover operations are implemented to failover to the selected backup site (block 1425).

Although FIG. 14 shows scan operations happening serially for the several available backup storage arrays, it should be understood that in some embodiments the scan operations (block 1435) are implemented on multiple available sites in parallel. In some embodiments, parallel scan operations are implemented in parallel by respective comparison engines 505 of data verification subsystems 500 on each of the backup sites.

By implementing a data verification process before performing role reversal on a remote data replication facility, it is possible to identify data mismatch errors prior to failover or failback on the remote data replication facility. In situations where the role reversal is planned sufficiently far in advance, a full data scan is implemented by comparing the DIF information of each track of data on the primary storage array with the DIF information of each corresponding track of data on the backup storage array. In situations where the role reversal is more imminent, a quick scan is implemented by comparing metadata signatures for each track of data on the primary storage array with the metadata signatures of each corresponding track of data on the backup storage array. Once any data mismatch errors are identified, the data on the backup storage array can be corrected prior to role reversal.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of data error identification prior to role reversal on a remote data replication facility, comprising:
    implementing a remote data replication facility including a primary storage array and a backup storage array;
    replicating filesystems included in a remote data replication group on the remote data replication facility from the primary storage array to the backup storage array, each filesystem being stored on a first plurality of tracks of backend storage resources of the primary storage array and being stored on a respective second plurality of tracks of backend storage resources of the backup storage array;
    servicing host IO operations on the filesystems by the primary storage array from data stored in the first plurality of tracks of the backend storage resources of the primary storage array;
    identifying an upcoming role reversal event on the remote data replication facility, the role reversal event being associated with a change on the remote data replication facility after which the backup storage array will be responsible for servicing subsequent host IO operations on the filesystems using data stored in the respective second plurality of tracks of the backend storage resources of the backup storage array;
    in response to identifying the upcoming role reversal event, implementing a comparison of the first plurality of tracks of the backend storage resources of the primary storage array with corresponding second plurality of tracks of the backend storage resources of the backup storage array, the comparison being implemented before implementing the role reversal event; and
    after completion of the comparison of the first plurality of tracks of the backend storage resources of the primary storage array with corresponding second plurality of tracks of the backend storage resources of the backup storage array, implementing the role reversal event.

2. The method of claim 1, wherein implementing the comparison of the first plurality of tracks of the backend storage resources of the primary storage array with corresponding second plurality of tracks of the backend storage resources of the backup storage array comprises implementing a quick scan by comparing metadata track signatures for the tracks on the primary storage array with metadata track signatures for the tracks on the backup storage array.

3. The method of claim 2, wherein the quick scan comprises, for each track:
    obtaining a first track signature for the track from metadata on the primary storage array;
    obtaining a second track signature for the track from metadata on the backup storage array;

comparing the first track signature with the second track signature;

in response to a determination that the first track signature is not the same as the second track signature, adding a track identifier for the track to a list of identified data errors indicating that the track on the backup storage array contains data that may not be the same as the data contained in the track on the primary storage array; and in response to a determination that the first track signature is the same as the second track signature, not adding the track identifier for the track to the list of identified data errors.

4. The method of claim 3, wherein each track has a plurality of sectors, and wherein the track signature comprises a respective field for each of the plurality of sectors, each respective field being incremented each of multiple times that data contained in the respective sector is updated.

5. The method of claim 4, wherein each track has sixteen sectors, and each field is a two-bit value.

6. The method of claim 1, wherein implementing the comparison of the first plurality of tracks of the backend storage resources of the primary storage array with corresponding second plurality of tracks of the backend storage resources of the backup storage array comprises implementing a full scan based on Data Integrity Field (DIF) values stored with the first plurality of tracks of the backend storage resources of the primary storage array and corresponding second plurality of tracks of the backend storage resources of the backup storage array.

7. The method of claim 6, wherein the full scan comprises, for each track:

obtaining a first DIF value for the track by reading the first DIF value from the track in the backend storage resources of the primary storage array;

obtaining a respective second DIF value for the track by reading the respective second DIF value from the track in the backend storage resources of the backup storage array;

comparing the first DIF value with the respective second DIF value;

in response to a determination that the first DIF value is not the same as the respective second DIF value, adding a track identifier for the track to a list of identified data errors indicating that the track on the backup storage array contains data that is not the same as the data contained in the track on the primary storage array; and in response to a determination that the first DIF value is the same as the respective second DIF value, not adding the track identifier for the track to the list of identified data errors.

8. The method of claim 1, further comprising:

determining an amount of time until occurrence of the upcoming role reversal event;

determining a first amount of time required to implement a quick scan by comparing metadata track signatures for the tracks on primary storage array with metadata track signatures for the tracks on the backup storage array;

determining a second amount of time required to implement a full scan based on Data Integrity Field (DIF) values stored with the tracks on the backend storage resources wherein the comparison is implemented on the primary storage array;

implementing the full scan if the second amount of time required to implement a full scan is less than the amount of time until occurrence of the upcoming role reversal event; and implementing the quick scan if the second amount of time required to implement a full scan is more than the amount of time until occurrence of the upcoming role reversal event.

9. The method of claim 1, further comprising determining from the comparison at least one data error on the backup storage array; and correcting the at least one data error on the backup storage array prior to implementing the role reversal event.

10. The method of claim 1, wherein the remote data replication facility comprises a plurality of backup storage arrays, the method further comprising:

implementing a comparison of the first plurality of tracks of the backend storage resources of the primary storage array with corresponding second plurality of tracks of the backend storage resources of each of the backup storage arrays to determine any data errors on any of the backup storage arrays;

identifying one of the backup storage arrays with a fewest number of data errors; and selecting the backup storage array with the fewest number of data errors to participate in the role reversal event.

11. A system for data error identification prior to role reversal on a remote data replication facility, comprising:

one or more computers and one or more storage devices storing instructions that are operable, when executed by the one or more computers, to cause the one or more computers to perform operations comprising:

implementing a remote data replication facility including a primary storage array and a backup storage array;

replicating filesystems included in a remote data replication group on the remote data replication facility from the primary storage array to the backup storage array, each filesystem being stored on a first plurality of tracks of backend storage resources of the primary storage array and being stored on a respective second plurality of tracks of backend storage resources of the backup storage array;

servicing host IO operations on the filesystems by the primary storage array from data stored in the first plurality of tracks of the backend storage resources of the primary storage array;

identifying an upcoming role reversal event on the remote data replication facility, the role reversal event being associated with a change on the remote data replication facility after which the backup storage array will be responsible for servicing subsequent host IO operations on the filesystems using data stored in the respective second plurality of tracks of the backend storage resources of the backup storage array;

in response to identifying the upcoming role reversal event, implementing a comparison of the first plurality of tracks of the backend storage resources of the primary storage array with corresponding second plurality of tracks of the backend storage resources of the backup storage array, the comparison being implemented before implementing the role reversal event; and after completion of the comparison of the first plurality of tracks of the backend storage resources of the primary storage array with corresponding second plurality of tracks of the backend storage resources of the backup storage array, implementing the role reversal event.

12. The system of claim 11, wherein implementing the comparison of the first plurality of tracks of the backend storage resources of the primary storage array with corresponding second plurality of tracks of the backend storage resources of the backup storage array comprises implementing a quick scan by comparing metadata track signatures for the tracks on the primary storage array with metadata track signatures for the tracks on the backup storage array.

13. The system of claim 12, wherein the quick scan comprises, for each track:
- obtaining a first track signature for the track from metadata on the primary storage array;
- obtaining a second track signature for the track from metadata on the backup storage array;
- comparing the first track signature with the second track signature;
- in response to a determination that the first track signature is not the same as the second track signature, adding a track identifier for the track to a list of identified data errors indicating that the track on the backup storage array contains data that may not be the same as the data contained in the track on the primary storage array; and
- in response to a determination that the first track signature is the same as the second track signature, not adding the track identifier for the track to the list of identified data errors.

14. The system of claim 13, wherein each track has a plurality of sectors, and wherein the track signature comprises a respective field for each of the plurality of sectors, each respective field being incremented each of multiple times that data contained in the respective sector is updated.

15. The system of claim 14, wherein each track has sixteen sectors, and each field is a two-bit value.

16. The system of claim 11, wherein implementing the comparison of the first plurality of tracks of the backend storage resources of the primary storage array with corresponding second plurality of tracks of the backend storage resources of the backup storage array comprises implementing a full scan based on Data Integrity Field (DIF) values stored with the first plurality of tracks of the backend storage resources of the primary storage array and corresponding second plurality of tracks of the backend storage resources of the backup storage array.

17. The system of claim 16, wherein the full scan comprises, for each track:
- obtaining a first DIF value for the track by reading the first DIF value from the track in the backend storage resources of the primary storage array;
- obtaining a respective second DIF value for the track by reading the respective second DIF value from the track in the backend storage resources of the backup storage array;
- comparing the first DIF value with the respective second DIF value;
- in response to a determination that the first DIF value is not the same as the respective second DIF value, adding a track identifier for the track to a list of identified data errors indicating that the track on the backup storage array contains data that is not the same as the data contained in the track on the primary storage array; and
- in response to a determination that the first DIF value is the same as the respective second DIF value, not adding the track identifier for the track to the list of identified data errors.

18. The system of claim 11, wherein the comparison is implemented on the primary storage array.

19. The system of claim 11, further comprising determining from the comparison at least one data error on the backup storage array; and
correcting the at least one data error on the backup storage array prior to implementing the role reversal event.

20. The system of claim 11, wherein the remote data replication facility comprises a plurality of backup storage arrays, and wherein the instructions are further operable to cause the one or more computers to perform operations comprising:
- implement a comparison of the first plurality of tracks of the backend storage resources of the primary storage array with corresponding second plurality of tracks of the backend storage resources of each of the backup storage arrays to determine any data errors on any of the backup storage arrays;
- identify one of the backup storage arrays with a fewest number of data errors; and
- select the backup storage array with the fewest number of data errors to participate in the role reversal event.

* * * * *